United States Patent
Yasuoka et al.

(10) Patent No.: US 6,612,965 B2
(45) Date of Patent: Sep. 2, 2003

(54) DRIVE FORCE CONTROL SYSTEM FOR VEHICLE WITH INFINITE SPEED RATIO CONTINUOUSLY VARIABLE TRANSMISSION

(75) Inventors: Masayuki Yasuoka, Kanagawa (JP); Hiromasa Sakai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 76 days.

(21) Appl. No.: 09/803,359

(22) Filed: Mar. 12, 2001

(65) Prior Publication Data
US 2001/0041644 A1 Nov. 15, 2001

(30) Foreign Application Priority Data

Mar. 14, 2000 (JP) ........................................ 2000-070096
Aug. 22, 2000 (JP) ........................................ 2000-251125

(51) Int. Cl.[7] .............................................. B60K 41/12
(52) U.S. Cl. .............................. 477/37; 477/40; 477/41; 477/116
(58) Field of Search .............................. 477/37, 40, 41, 477/116

(56) References Cited

U.S. PATENT DOCUMENTS

| 4,962,678 | A | * | 10/1990 | Murano et al. |
| 5,170,868 | A | * | 12/1992 | Yamashita et al. |
| 5,707,316 | A | * | 1/1998 | Tanahashi et al. |
| 5,961,418 | A | * | 10/1999 | Taniguchi et al. |
| 6,106,432 | A | * | 8/2000 | Nishida |
| 6,317,672 | B1 | * | 11/2001 | Kuramoto et al. |

FOREIGN PATENT DOCUMENTS

| JP | 405263906 A | * | 10/1993 |
| JP | 406241291 A | * | 8/1994 |
| JP | 10-267117 | | 10/1998 |

* cited by examiner

Primary Examiner—Christopher P. Schwartz
Assistant Examiner—Xuan Lan Nguyen
(74) Attorney, Agent, or Firm—Foley & Lardner

(57) ABSTRACT

When an engine control unit (70) controls an engine rotation speed Ne to an idle rotation speed, and a select range is changed over from a non-travel range to a travel range, a speed change control unit (80) commands an increase of engine torque supplied to the engine control unit (70), and increases the transmission torque of a continuously variable transmission (2) according to the increase amount of the engine torque.

11 Claims, 26 Drawing Sheets

DRIVE FORCE CONTROL SYSTEM FOR VEHICLE WITH INFINITE SPEED RATIO CONTINUOUSLY VARIABLE TRANSMISSION

FIELD OF THE INVENTION

This invention relates to improvement of a drive force control system for an infinite speed ratio continuously variable transmission of vehicle.

BACKGROUND OF THE INVENTION

A belt or toroidal continuously variable transmission for vehicle is known. Also known is an infinite speed ratio continuously variable transmission where, to further enlarge the speed change range of the transmission, the continuously variable transmission is combined with a fixed speed ratio transmission and a planetary gear set so that the speed ratio can be varied infinitely, as disclosed for example in Tokkai Hei 10-267117 published by the Japanese Pat. Office in 1998.

SUMMARY OF THE INVENTION

However, in the aforesaid infinite speed ratio continuously variable transmission, the unit input shaft was directly joined to the engine. When a power circulation mode clutch is engaged to begin torque transmission when the vehicle starts, the transmitted torque increases and the engine load increases, while at the same time, the engine rotation speed which was under an idle speed control temporarily increases sharply as shown by the dotted line in FIG. 7. However, in cases where the rotation speed feedback cannot keep up under the idle speed control, the engine stalls.

To avoid the engine stalling, a continuously variable transmission may also be controlled so that the transmitted torque of the infinite speed ratio continuously variable transmission increases gradually, but in this case, the appearance of the drive force was delayed, and the vehicle could not start promptly.

It is therefore an object of this invention, which was conceived in view of the above problems, to avoid an engine stall or racing when a vehicle starts in an infinite speed ratio continuously variable transmission, while at the same time allowing rapid appearance of drive force so that the vehicle can start promptly. Here racing means the rapid engine speed rise which driver does not expect.

In order to achieve the above objects, this invention provides a drive force control system for such a vehicle that comprises an engine, a continuously variable transmission, a fixed speed ratio transmission, a planetary gear set and a selector lever. The continuously variable transmission has a first output shaft to which the rotation of the engine is transmitted at an arbitrary speed ratio. The fixed speed ratio transmission has a second output shaft to which the rotation of the engine is transmitted at fixed speed ratio. The planetary gear set has a first rotation element joined to the first output shaft, a second rotation element joined to the second output shaft, and a third rotation element which varies a rotation direction and a rotation speed according to a difference between a rotation speed of the first rotation element and a rotation speed of the second rotation element. The vehicle runs according to the rotation of the third rotation element.

The drive force control system comprises a sensor which detects the operating range, a first mechanism which increases an output torque of the engine, a second mechanism which increases a torque transmitted by the continuously variable transmission, and a microprocessor. The microprocessor is programmed to determine if the engine rotation speed is equal to a predetermined idle rotation speed, determine if the operating range has changed over from the non-travel range to the travel range, control the first mechanism to increase the output torque of the engine and control the second mechanism to increase the torque transmitted by the continuously variable transmission, when the operating range has changed over from the non-travel range to the travel range.

The details as well as other features and advantages of this invention are set forth in the remainder of the specification and are shown in the accompanying drawings.

DESCRIPTION OF THE PREFERRED EMBODIMENTS

Figure 1:
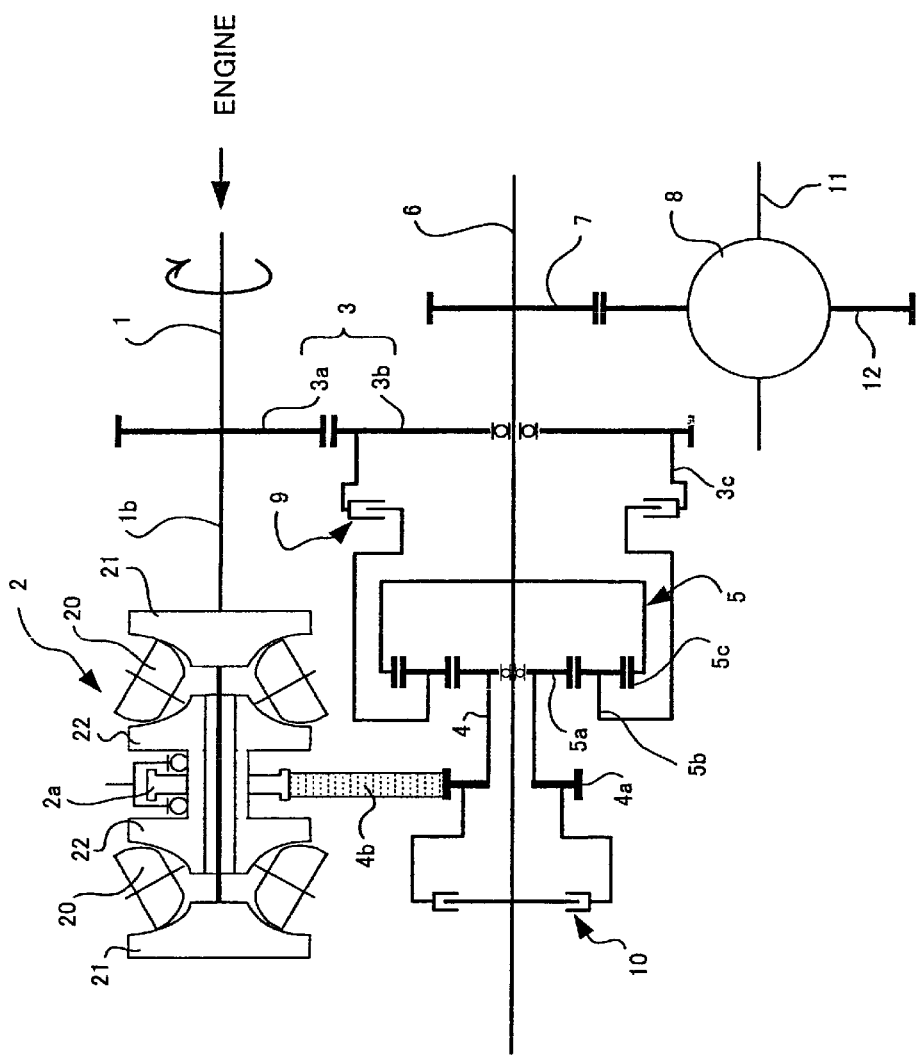
FIG. 1 is a schematic view of an infinite speed ratio continuously variable transmission showing a first embodiment of this invention.
Figure 2:
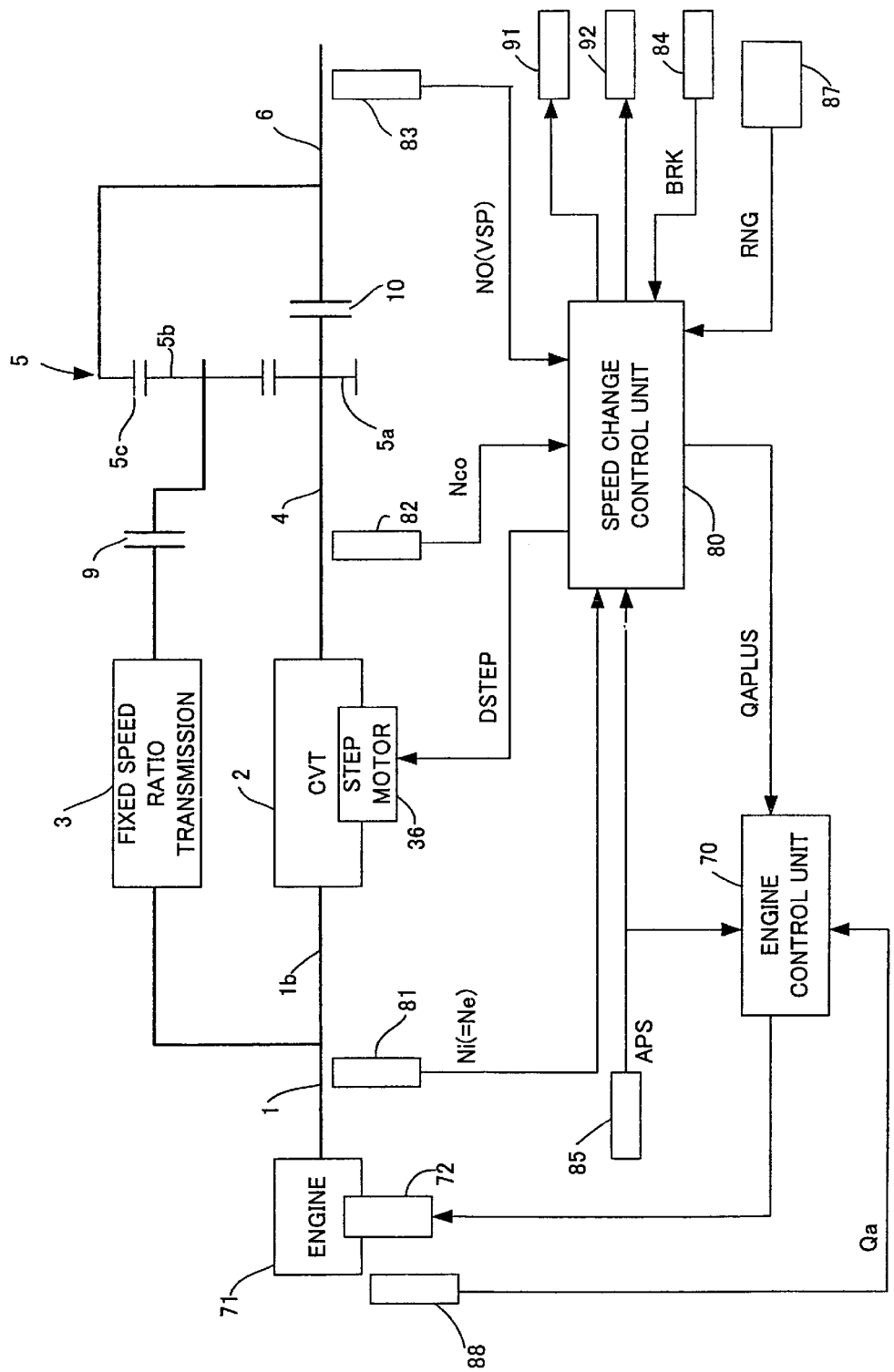
FIG. 2 is a diagram showing a control device of an infinite speed ratio continuously variable transmission according to this invention.

Referring to FIG. 1 and FIG. 2, an infinite speed ratio continuously variable transmission comprises a continuously variable transmission 2 which permits continuous variation of a speed ratio, and a fixed speed ratio transmission 3 (reducing gear) comprising a gear 3a and a gear 3b connected in parallel to a unit input shaft 1 joined to an engine 71. Output shafts 4, 3c of these transmissions 2,3 are also coaxially disposed with the unit output shaft 6, and are joined to a planetary gear set 5. The output shaft 4 of the continuously variable transmission 2 is joined to a sun gear 5a of the planetary gear set 5 and direct mode clutch 10. The output shaft 3c of the fixed speed ratio transmission 3 is also joined to a carrier 5b of the planetary gear set 5 via a power circulation mode clutch 9.

The continuously variable transmission output shaft 4 is joined to the sun gear 5a, and receives a drive force of the continuously variable transmission 2 from a sprocket 4a and a chain 4b. The continuously variable transmission output shaft 4 is selectively joined to the unit output shaft 6, which is the output shaft of the infinite speed ratio continuously variable transmission, via the direct mode clutch 10.

On the other hand, the carrier gear 5b which is selectively joined to the output shaft 3c of the fixed speed ratio transmission 3 via the power circulation mode clutch 9, is connected to the unit output shaft 6 via a ring gear 5c.

The unit output shaft 6 is provided with a speed change output gear 7. This speed change output gear 7 meshes with a final gear 12 of a differential gear 8. A drive shaft 11 which is joined to the differential gear 8 transmits a drive force at a predetermined overall gear ratio.

Referring to FIG. 1, the continuously variable transmission 2 comprises two pairs of input disks 21 and output disks 22 formed in a double cavity half toroidal shape which respectively grip and press power rollers 20, 20. An output sprocket 2a interposed between the pair of output disks 22 is joined to the sprocket 4a formed on the continuously variable transmission output shaft 4 of the unit output shaft 6 disposed parallel to the unit input shaft 1 via the chain 4b.

The unit input shaft 1 and a CVT shaft 1b are joined in the rotation direction via a loading cam device, not shown. The unit input shaft 1 is joined to the engine 71, on which a gear 3a of the fixed speed ratio transmission 3 is formed. The CVT shaft 1b is connected to the two sets of input disks 21, 21, the power rollers 20, 20 are gripped between the input and output disks due to a pressing force in the axial direction generated by the loading cam device according to the input torque from the unit input shaft 1.

Figure 3:
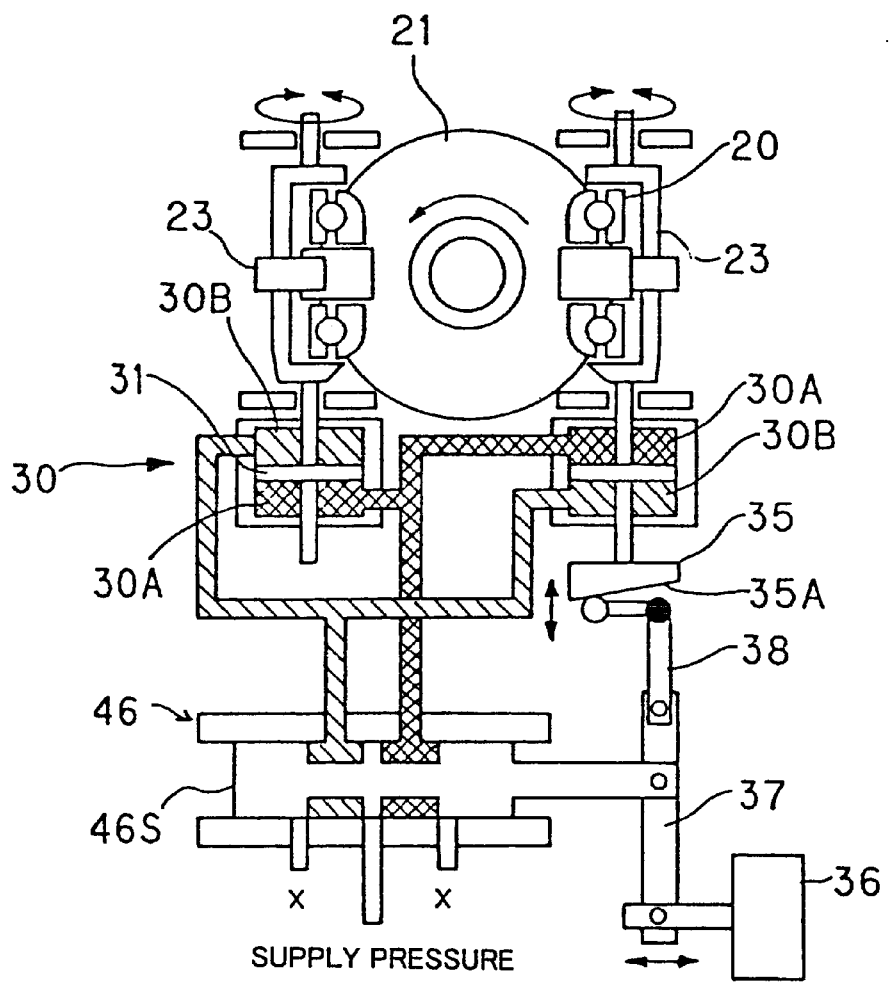
FIG. 3 is a diagram showing a toroidal continuously variable transmission.

The power rollers 20 are axially supported by trunnions 23 (power roller supporting members) of which the lower ends are joined to hydraulic cylinders 30, these trunnions being free to displace in an axial direction and rotate around the axis, as shown in FIG. 3. At the lower end of one of the trunnions 23 of the plural trunnions 23, a precess cam 35 is provided which feeds back an axial displacement amount of the trunnion 23 and gyration angle of the power roller 20 (rotation angle of the trunnion 23 converts into the real speed ratio) to a servo valve 46.

The precess cam 35 comprises a cam surface 35A (or a cam groove) having a predetermined inclination in a circumferential direction as shown in FIG. 3, and one end of a feedback link 38 which is free to pivot slides on this cam surface 35A, as shown in FIG. 3.

The feedback link 38 may for example be formed in an L shape, and its midpoint is supported free to pivot as shown in FIG. 3. One end of the feedback link 38 slides on the cam surface 35A, and the other end engages with one end of a speed change link 37. The feedback link 38 transmits a rotation amount and axial displacement amount of the trunnion 23, i.e., the gyration angle of the power roller 20, to one end of the speed change link 37.

The speed change link 37 is joined in its middle part to a spool 46S of the servo valve 46, and the other end of the speed change link 37 which is linked to the feedback link 38, is connected to a step motor 36 (actuator). The speed change link 37 causes the spool 46S of the servo valve 46 (speed change control valve) to displace in the axial direction under the drive of the step motor 36. Further, the spool 46S of the servo valve 46 displaces in the axial direction according to the rotation and axial displacement of the trunnion 23.

A supply pressure from an oil pressure source is supplied to one of oil chambers 30A, 30B devided by a piston 31 in the hydraulic cylinder 30 according to the axial displacement of the spool 46S, and the other chamber is drained. In this way, the differential pressure on the oil chambers 30A, 30B of the hydraulic cylinder 30 is varied, and the trunnion 23 is driven in the axial direction.

As shown in FIG. 3, the hydraulic cylinders 30, 30 of the facing trunnions 23, 23 drive the trunnions 23, 23 in mutually opposite directions, so the positions of the oil chambers 30A, 30B are reversed in each other.

In this infinite speed ratio continuously variable transmission, a direct mode and a power circulation mode can be selectively used. Herein, the direct mode means a mode where the power circulation mode clutch 9 is disengaged, the direct mode clutch 10 is engaged, and the drive force is transmitted according to a speed ratio IC (hereafter referred to as CVT ratio IC) of the continuously variable transmission 2. The power circulation mode means a mode where the power circulation mode clutch 9 is engaged, the direct mode clutch 10 is disengaged, and a unit speed ratio II (speed ratio of the unit input shaft 1 and unit output shaft 6, hereafter referred to as IVT ratio II) of the entire infinite speed ratio continuously variable transmission, is controlled in an effectively continuous manner from a negative value to a positive value including infinity according to the difference of speed ratio of the continuously variable transmission 2 and fixed speed ratio transmission 3.

Figure 13:
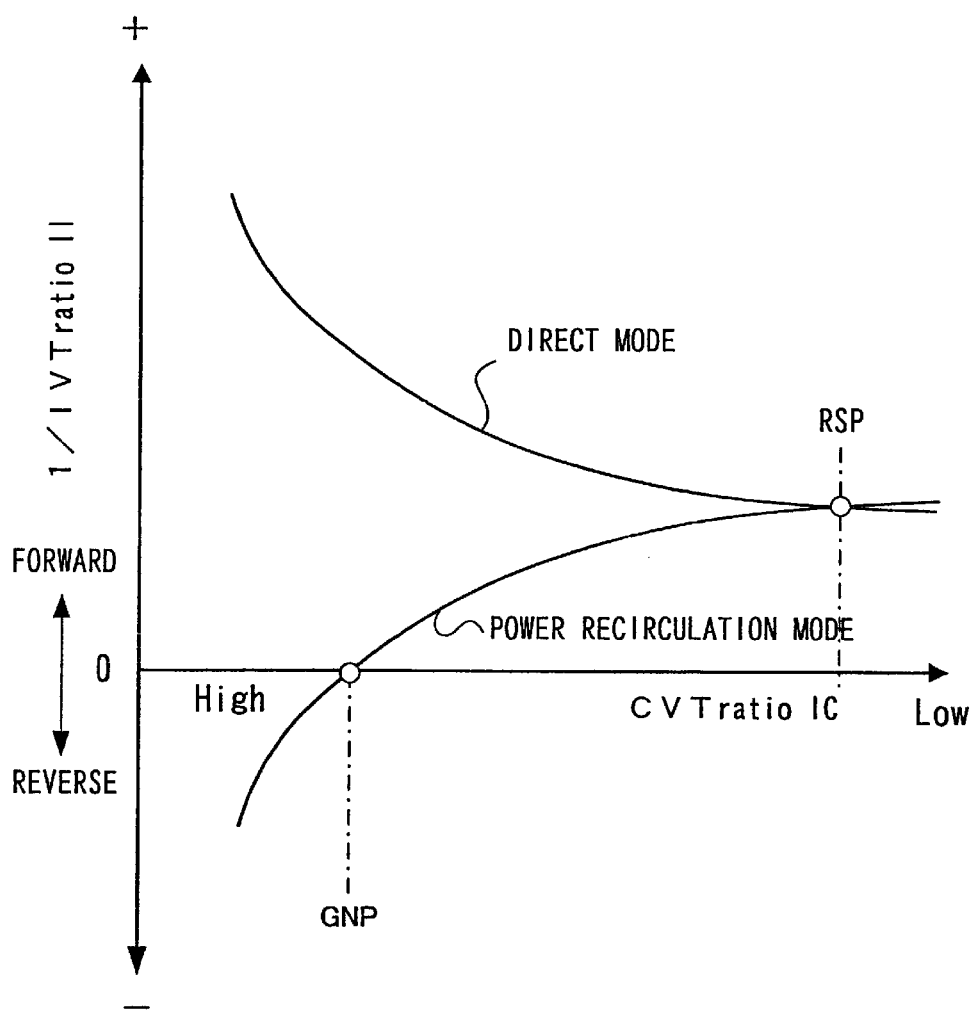
FIG. 13 is a map showing a relation between a CVT ratio IC and IVT ratio II.

At a geared neutral point GNP of the power circulation mode at which the IVT ratio II is infinite (1/II =0), the vehicle can be started by varying the IVT ratio II from the stationary state as shown in FIG. 13.

The change-over between the aforesaid power circulation mode and the direct mode may for example be performed at a rotation synchronous point RSP at which the rotation speeds of the output shaft 4 of the continuously variable transmission 2 and output shaft 3c of the fixed speed ratio transmission 3 coincide, as shown in FIG. 13.

The change-over of the aforesaid power circulation mode and direct mode is performed via solenoids 91, 92 shown in FIG. 2.

The solenoid 91 controls a signal pressure based on an oil pressure command value tPd of a speed change control unit 80, and controls engaging and disengaging of the direct mode clutch 10 by adjusting the oil pressure supplied to the direct mode clutch 10.

Likewise, the solenoid 92 controls a signal pressure based on an oil pressure command value tPrc of the speed change control unit 80, and controls engaging and disengaging of the power circulation mode clutch 9 by adjusting the oil pressure supplied to the power circulation mode clutch 9.

Herein, speed change control is controlled by the speed change control unit 80 which essentially comprises a microcomputer, as shown in FIG. 2. The speed change control unit 80 sets the IVT ratio II according to the running state based on a preset map, not shown. As described later, when the vehicle starts, a signal which increases the engine torque (torque increase auxiliary intake air amount QAPLUS) is sent to an engine control unit 70.

For this purpose, the output from an input shaft rotation speed sensor 81 which detects a rotation speed Ni of the unit input shaft 1, i.e., an engine rotation speed Ne, the output from a CVT output shaft rotation speed sensor 82 which detects an output shaft rotation speed Nco of the continuously variable transmission 2, the output from a vehicle speed sensor 83 which detects a rotation speed No of the unit output shaft 6 as a vehicle speed VSP, a signal of an accelerator pedal depression amount APS (or throttle opening TVO) is detected by an accelerator operation amount sensor 85, a signal BRK from a brake switch 84 which detects that a brake pedal is depressed, and a signal of a select range RNG detected by an inhibitor switch 87 which responds to a select lever or select switch, not shown, are input to the speed change control unit 80.

In this embodiment, the select range RNG may be a D range (forward range), R range (reverse range), N range (neutral range) or P range (parking range).

The vehicle speed VSP is computed by multiplying the detected rotation speed No of the unit output shaft 6 by a predetermined constant.

The speed change control unit 80 processes the detection values from the various sensors as a running state, determines a target IVT ratio based on the accelerator pedal depression amount APS and vehicle speed VSP, and drives the step motor 36 which controls the speed change mechanism of the continuously variable transmission 2. The speed change control unit 80 drives the solenoids 91, 92 so as to obtain a running mode according to the running state, and controls the engaging state of the power circulation mode clutch 9 and direct mode clutch 10.

The engine 71 is controlled by an engine control unit 70 comprising a microcomputer or the like, as shown in FIG. 2. In the case of an injector type premixing internal combustion engine, for example, a fuel injection amount of an injector 75 provided in an intake air passage, or an ignition period of the spark plug 76, are controlled according to the accelerator pedal depression amount APS, engine rotation speed Ne detected by a crank angle sensor 89 or intake air amount Qa detected by an air flow meter 88, as shown in FIG. 4.

When the engine rotation speed Ne is equal to or less than a predetermined value, and the accelerator pedal depression amount APS is 0/8, the idle speed control is performed by feedback of a target idle rotation speed and the real engine rotation speed Ne so that the engine rotation speed Ne is a predetermined idle rotation speed Nidle.

Figure 4:
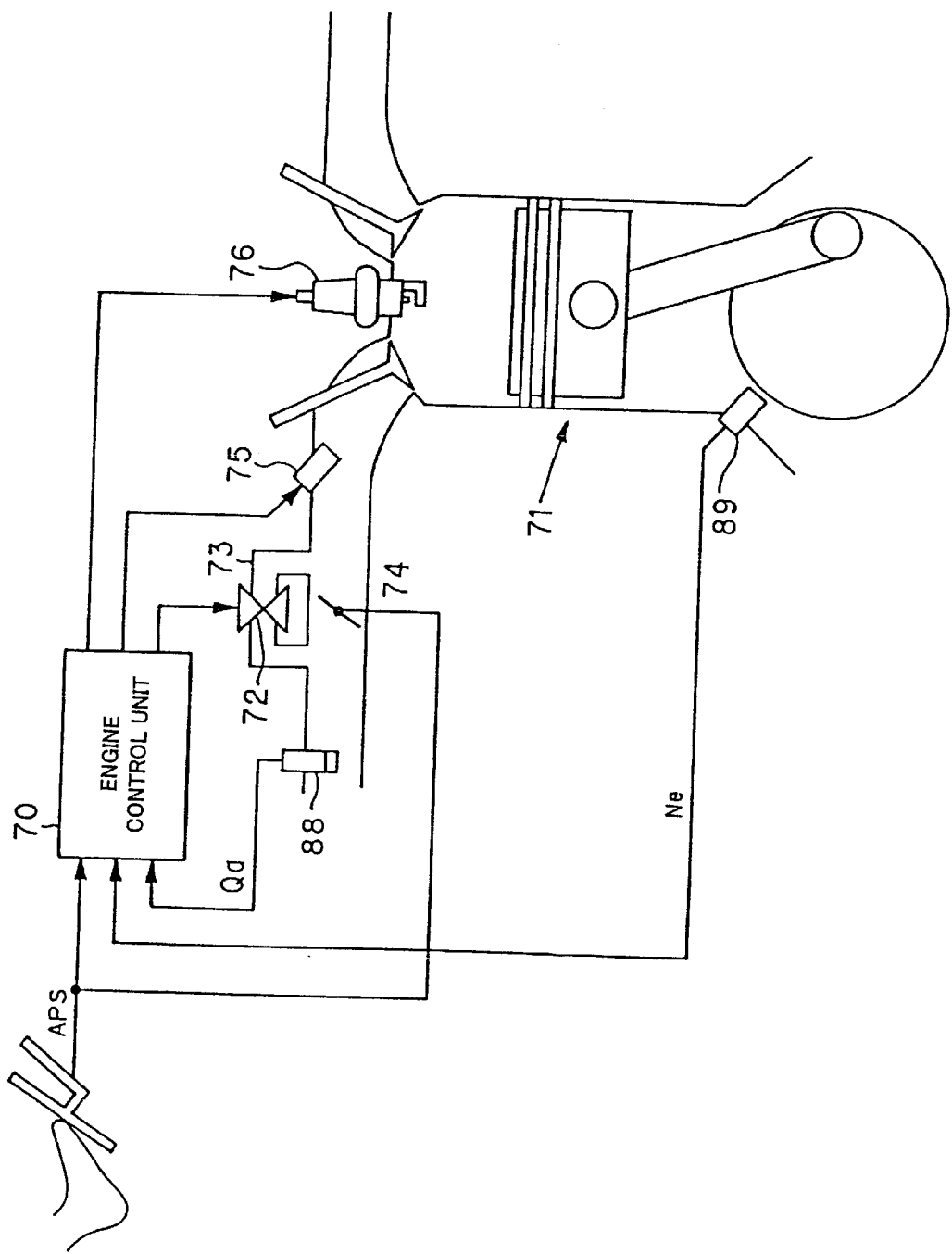
FIG. 4 is a diagram showing an engine and an engine control unit.

This idle speed control may be performed for example by an auxiliary air control valve 72 provided in a bypass passage 73 in parallel with a throttle valve 74 in the intake air passage, as shown in FIG. 4. The auxiliary air control valve 72 which is duty controlled by the engine control unit 70, adjusts the auxiliary air flowrate of the bypass passage 73 so that the engine rotation speed Ne is a target value.

During the idle speed control, the engine control unit 70 drives the auxiliary air control valve 72 based on the torque increase auxiliary air amount QAPLUS from the speed change control unit 80, as described later. This is in order to increase the engine torque, and make the vehicle start smoothly by a creep torque.

Next, an example of the control performed by the speed change control unit 80 when the vehicle starts will be described in detail referring to the flowchart of FIG. 5. This flowchart is performed at a predetermined interval, e.g. 10 milliseconds, when the vehicle speed VSP is equal to or less than a predetermined value (e.g., 10 km/h).

First, in a step S1, the select range RNG detected by the inhibitor switch 87 and the oil pressure command value tPrc of the power circulation mode clutch 9 sent to the solenoid 92, are respectively read.

In a step S2, the selected range is determined whether or not the D range or R range is selected. The D range or R range is selected depending on whether or not the select range RNG is outside the N range or P range and the oil pressure command value tPrc is greater than a predetermined value Pk. It is also determined whether the power circulation mode clutch 9 is engaged, and the vehicle can be started.

The predetermined value Pk is a preset value which is used to determine the oil pressure at which the power circulation mode clutch is fully engaged.

If the vehicle can start, the routine proceeds to a step S3, otherwise the routine proceeds to a step S8 and subsequent steps.

In the step S3, the torque increase auxiliary air amount QAPLUS supplied to the engine control unit 70 is set to a predetermined value QACREAP. This is in order to increase engine torque during the idle speed control, and permit the vehicle to travel under creep.

This predetermined value QACREAP is an air amount such that the auxiliary air flowrate passing through the auxiliary air control valve 72 is a creep torque equivalent value. The predetermined value QACREAP may be a preset fixed value, or a value found according to the running state such as the slope on which the vehicle is traveling.

Next, in a step S4, it is determined whether or not a flag FSTEP is 0 in order to increase the transmitted torque of the infinite speed ratio continuously variable transmission. Herein, the flag FSTEP is a flag which shows whether or not the step motor 36 was driven.

If this flag FSTEP is 1, it shows that the step motor 36 has already been driven to increase the transmitted torque, and if it is 0, in shows that the step motor 36 has not yet been driven.

If the flag FSTEP=0, the routine proceeds to a step S5 and the step motor 36 is driven. On the other hand, if FSTEP=1, the routine proceeds to a step S7, and an operating command value (step number) DSTEP supplied to the step motor 36 is set to 0 so that the step motor 36 is not driven.

In the step S5, the operating command value DSTEP supplied to the step motor 36 is set to a preset step number CSTEP. The flag FSTEP is also set to 1, showing that the step motor 36 has already been driven to increase the transmitted torque.

Herein, the predetermined step number CSTEP is a preset value which displaces the spool 46S of the servo valve 46 by the step motor 36, varies the differential pressure of the oil chambers 30A, 30B of the hydraulic cylinder 30, increases the torque transmission force of the power rollers 20, 20 and permits transmission of creep torque, as shown in FIG. 3.

In the toroidal continuously variable transmission 2, the magnitude of the differential pressure acting on the piston 31 of the hydraulic cylinder 30 determines the magnitude of the transmitted torque of the power rollers 20, so the differential pressure and the transmitted torque are controlled by opening the servo valve 46 by a minute amount.

In a step S6, the step motor 36 is driven based on the operating command value DSTEP (=CSTEP) set in the step S5. The torque increase auxiliary air amount QAPLUS is sent to the engine control unit 70, and the engine torque is increased during the idle speed control. The incremental amount of the engine torque (approximately QAPLUS) and incremental amount of the transmitted torque of the infinite speed ratio continuously variable transmission (approximately CSTEP) are set to be effectively equal.

At the same time, in the aforesaid step S2, when the select range RNG is a non-travel range, i.e., the P range or N range, or the oil pressure command value tPrc is less than the predetermined value Pk, and the engaging force of the power circulation mode clutch 9 is not generated, a step 8 is selected. In the step S8, the torque increase auxiliary air amount QAPLUS is set to 0 so as not to generate a creep torque.

In a step S9, to increase the transmitted torque of the infinite speed ratio continuously variable transmission, it is determined whether or not the flag FSTEP, which shows whether the step motor 36 was driven, is 1.

If the flag FSTEP=1, as the step motor 36 was already driven in the processing of the above step S5, the routine proceeds to a step S10. In the step S10, the operating command value DSTEP set in the step S5 is set to a value which the preset step number subtract from the CSTEP, the position of the step motor 36 is restored to its original position, the flag FSTEP is set to 0, and the routine proceeds to the step S6.

If the flag FSTEP=0, the step motor 36 has not yet been driven, so the routine proceeds to a step S11, the operating command value DSTEP is set to 0, and the routine proceeds to the step S6 after holding the current position of the step motor 36.

Figure 6:
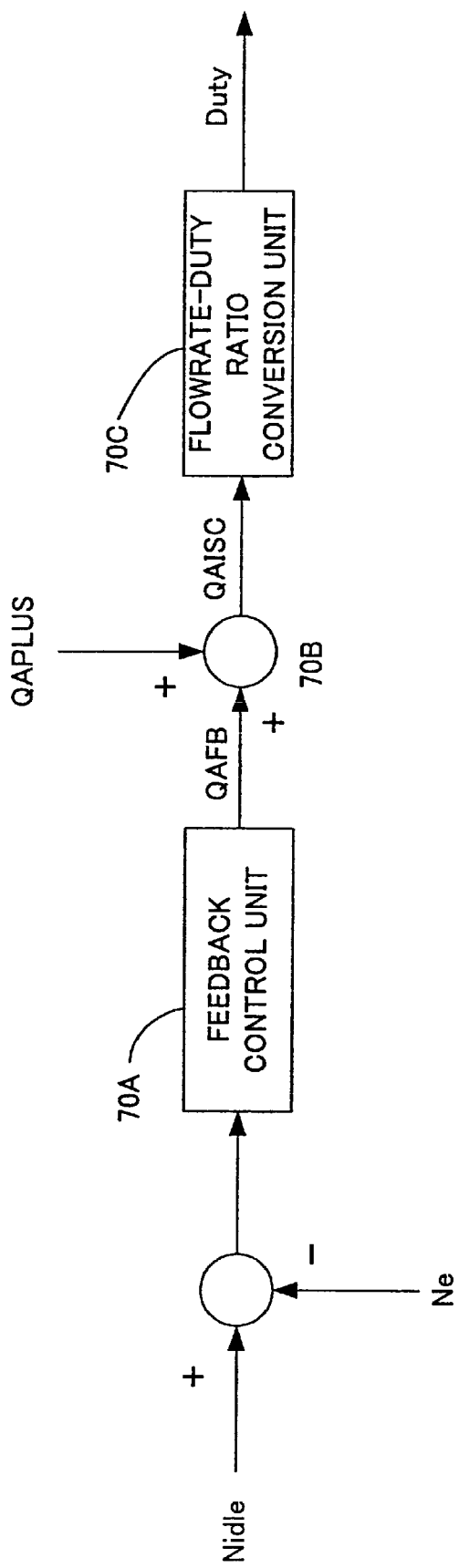
FIG. 6 is a flowchart showing an example of the idle speed control performed by the engine control unit.

On the other hand, in the engine control unit 70, if the accelerator pedal is in the released state (accelerator pedal depression amount APS is 0), the idle speed control is performed by a feedback control unit 70A, an addition unit 70B and a flowrate-duty ratio conversion unit 70C, as shown in FIG. 6.

The feedback control unit 70A computes an idle rotation speed feedback control air amount QAFB by feedback control so that the engine rotation speed Ne detected by the crank angle sensor 89 is the predetermined target idle rotation speed (Nidle).

The addition unit 70B outputs the result obtained by adding the torque increase auxiliary air amount QAPLUS from the speed change control unit 80 to the idle rotation speed feedback control air amount QAFB as an idle rotation speed control total air amount QAISC.

The flowrate-duty ratio conversion unit 70C determines a duty ratio Duty according to this idle rotation speed control total air amount QAISC, and drives the auxiliary air control valve 72.

Therefore, during the idle speed control of the engine control unit 70, engine torque can be rapidly produced due to the torque increase auxiliary air amount QAPLUS from the speed change control unit 80.

Figure 7:
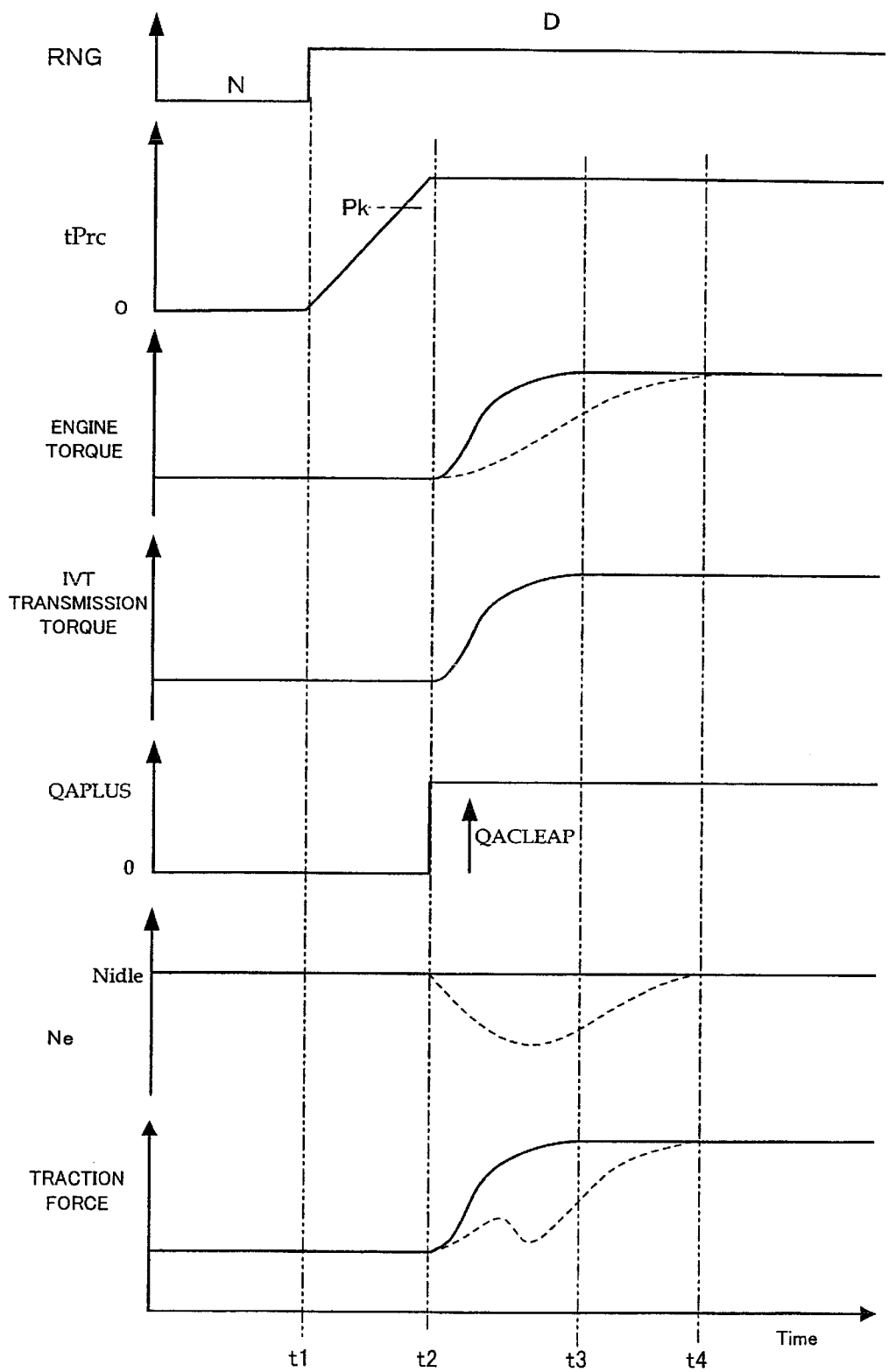
FIG. 7 is a diagram showing a vehicle start due to a creep torque, showing a relation between a selected range, power circulation mode clutch oil pressure command value tPrc, engine torque, transmitted torque of the continuously variable transmission, torque increase auxiliary intake air amount QAPLUS, engine rotation speed Ne, vehicle drive force and time. The solid line in the diagram shows this invention, and the dotted line shows the prior art.

Due to the above control by the speed change control unit 80 and engine control unit 70, when the vehicle starts during the idle speed control, the situation is as shown in FIG. 7.

FIG. 7 shows various running states from when the select range is set to the N range and the engine is under the idle speed control with the accelerator pedal released and the vehicle stationary, to when there is a change-over to the D range and the vehicle starts due to creep torque.

At a time t1, the select lever is changed over from the N range to the D range. The speed change control unit 80 first increases the oil pressure command value tPrc sent to the solenoid 92, and starts engaging of the power circulation mode clutch 9.

Figure 5:
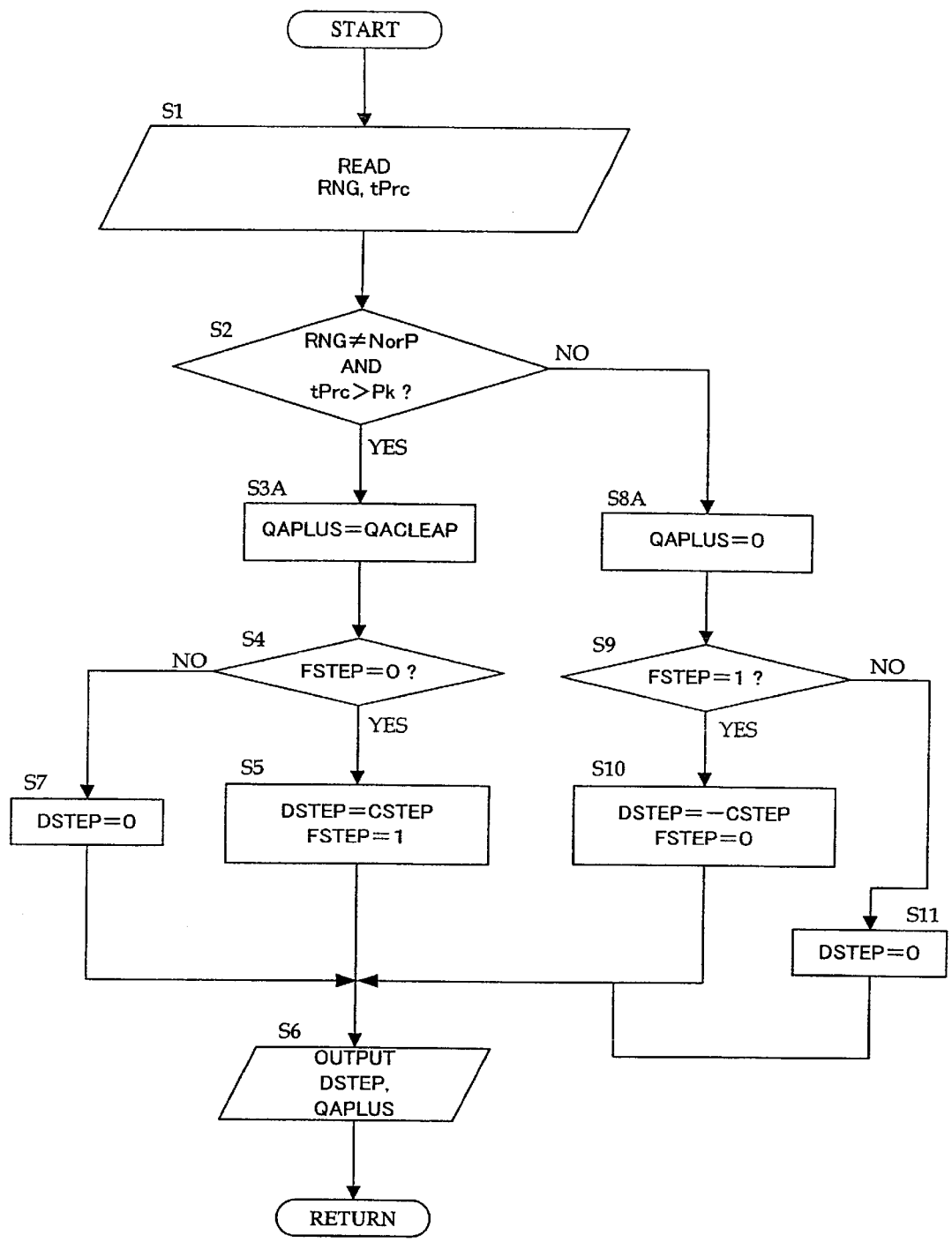
FIG. 5 is a flowchart showing an example of the control performed by a speed change control unit.

When engaging of the power circulation mode clutch 9 is complete at a time t2, the step motor 36 is driven to the predetermined value CSTEP due to the control of FIG. 5 above. Hence, the transmitted torque of the power rollers 20, i.e., the transmitted torque of the infinite speed ratio continuously variable transmission, begins to rise.

Simultaneously, at the time t2, the torque increase auxiliary air amount QAPLUS supplied from the speed change control unit 80 to the engine control unit 70, increases by the creep torque equivalent value QACREAP. As a result, due to the idle speed control of FIG. 6 above, the engine torque also rises rapidly, and at a time t3, an engine torque according to QACREAP is obtained.

On the other hand, the transmitted torque of the continuously variable transmission 2 which started to rise from the time t2, increases to a target value according to the drive amount CSTEP of the step motor 36 by the time t3. The transmitted torque of the infinite speed ratio continuously variable transmission also increases corresponding to the incremental value (QAPLUS) of the engine torque.

Therefore, when there is the change-over from the N range to the D range, the speed change control unit 80 simultaneously commands increase of the transmitted torque of the continuously variable transmission 2 and increase of the torque of the engine 71, and sets these incremental values to be equal. As a result, the engine torque and the transmitted torque of the continuously variable transmission 2 appear at effectively the same time, and the vehicle can be started according to the increase of the transmitted torque and increase of engine torque while the engine rotation speed Ne is maintained at the predetermined idle rotation speed Nidle. Therefore, engine stall which occurred in the aforesaid prior art example is avoided, and vehicle start due to creep torque can be performed rapidly and smoothly.

In the aforesaid prior art example, as shown by the dotted line in FIG. 7, when the transmitted torque increases from the time t2, the engine rotation speed Ne falls below the idle rotation speed Nidle due to the increase of transmitted torque, and the idle rotation speed feedback control air amount QAFB shown in FIG. 6 increases. As a result, the engine torque also gradually increases, but as the engine rotation speed Ne temporarily falls, there is a very high possibility that the engine will stall. In addition, due to the fluctuation of engine rotation speed Ne, the output (drive force) transmitted torque of the infinite speed ratio continuously variable transmission also fluctuates as shown by the dotted line in the figure, and drivability on vehicle start-up declines.

Further, as the creep torque of the prior art example increases only due to feedback control of the engine rotation speed, it does not appear rapidly, and the target engine torque is not achieved until a time t4 in FIG. 7.

On the other hand, in this invention, the speed change control unit 80 performs control to increase the transmitted torque and the torque increase auxiliary air amount QAPLUS simultaneously. Therefore, the engine torque can be rapidly made to increase to the target creep torque, and even if the transmitted torque of the continuously variable transmission 2 is made to rise rapidly, engine stall is avoided and a fast start can be performed. Therefore, the starting performance of a vehicle comprising an infinite speed ratio continuously variable transmission can be enhanced.

Further, the transmitted torque of the continuously variable transmission 2 is increased and the engine torque is increased after the power circulation mode clutch 9 has been fully engaged, so racing of the engine when the vehicle starts under creep torque is avoided, and torque can be definitively transmitted.

Figure 8:
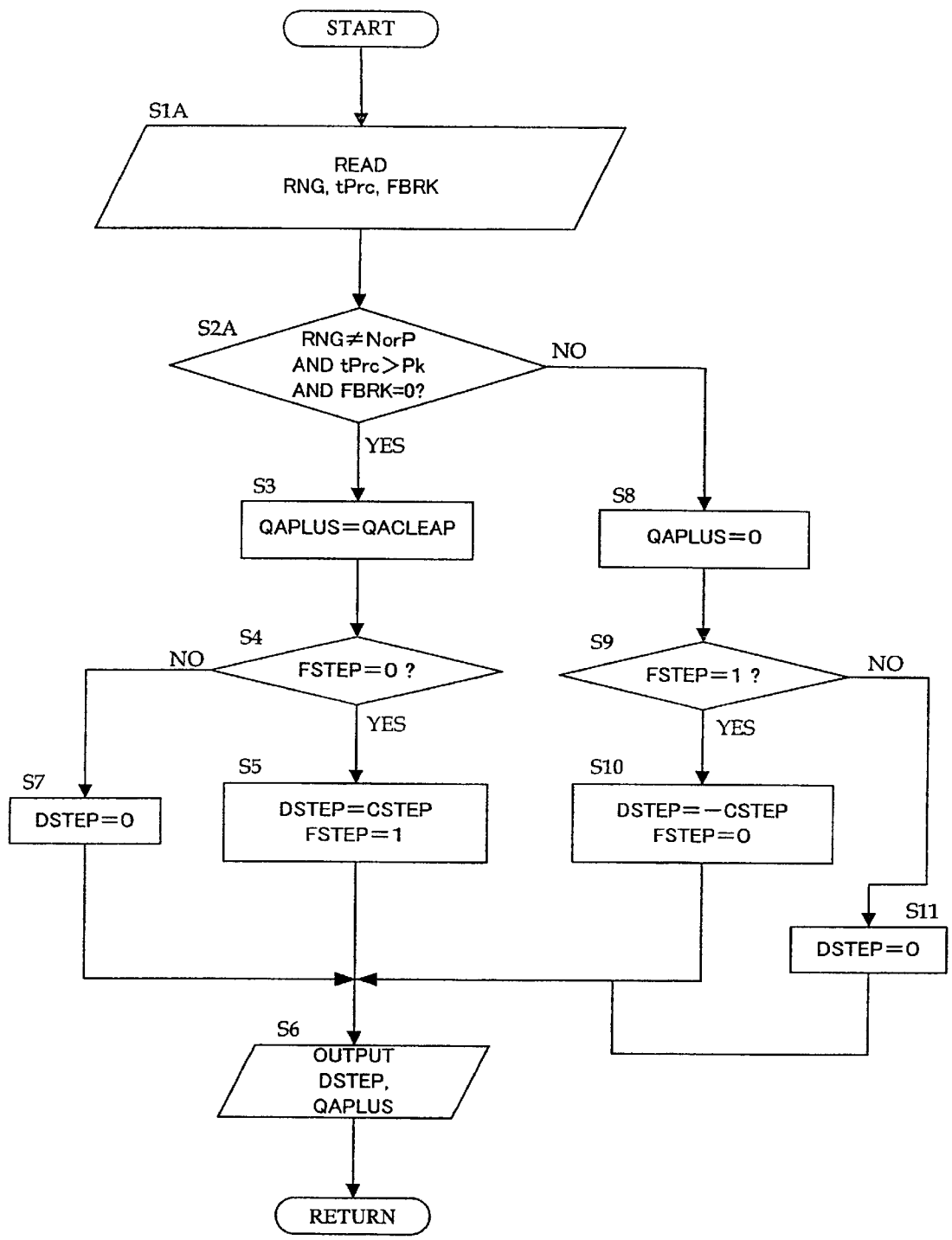
FIG. 8 is similar to FIG. 5, but showing a second embodiment, and is a flowchart showing an example of the control performed by the speed change control unit.

FIG. 8 shows a second embodiment. Here, a determination by a signal BRK from the brake switch 84 is added in the steps S1, S2 of the flowchart shown in FIG. 5 of the first embodiment, the remaining features of the construction being identical to those of the first embodiment.

In a step S1A, in addition to the select range and the oil pressure command value tPrc supplied to the power circulation mode clutch 9, a brake operating flag FBRK based on the signal BRK from the brake switch 84 is read.

This brake operating flag FBRK is set to 1 when the brake is operated, otherwise it is set to 0.

In a step S2A, when the select range RNG is outside the N range or P range, the oil pressure command value tPrc is greater than the predetermined value Pk and the brake operating flag FBRK is 0, drive processing under creep torque of a step S3 and subsequent steps is performed. In other cases, the routine proceeds to vehicle stop processing of a step S8 and subsequent steps.

When the select lever selects a travel range, i.e. the D range or R range, and the power circulation mode clutch 9 is engaged, the vehicle can start. However, by adding the determination of the brake operating flag FBRK, it is possible to detect whether or not the driver intended to start the vehicle If the brake operating flag FBRK is 1 and the vehicle has stopped when the brake was operated, the driver did not intend to start the vehicle even if the D range or R range was selected, so superfluous generation of creep torque is prevented, and fuel cost-performance is enhanced.

Figure 9:
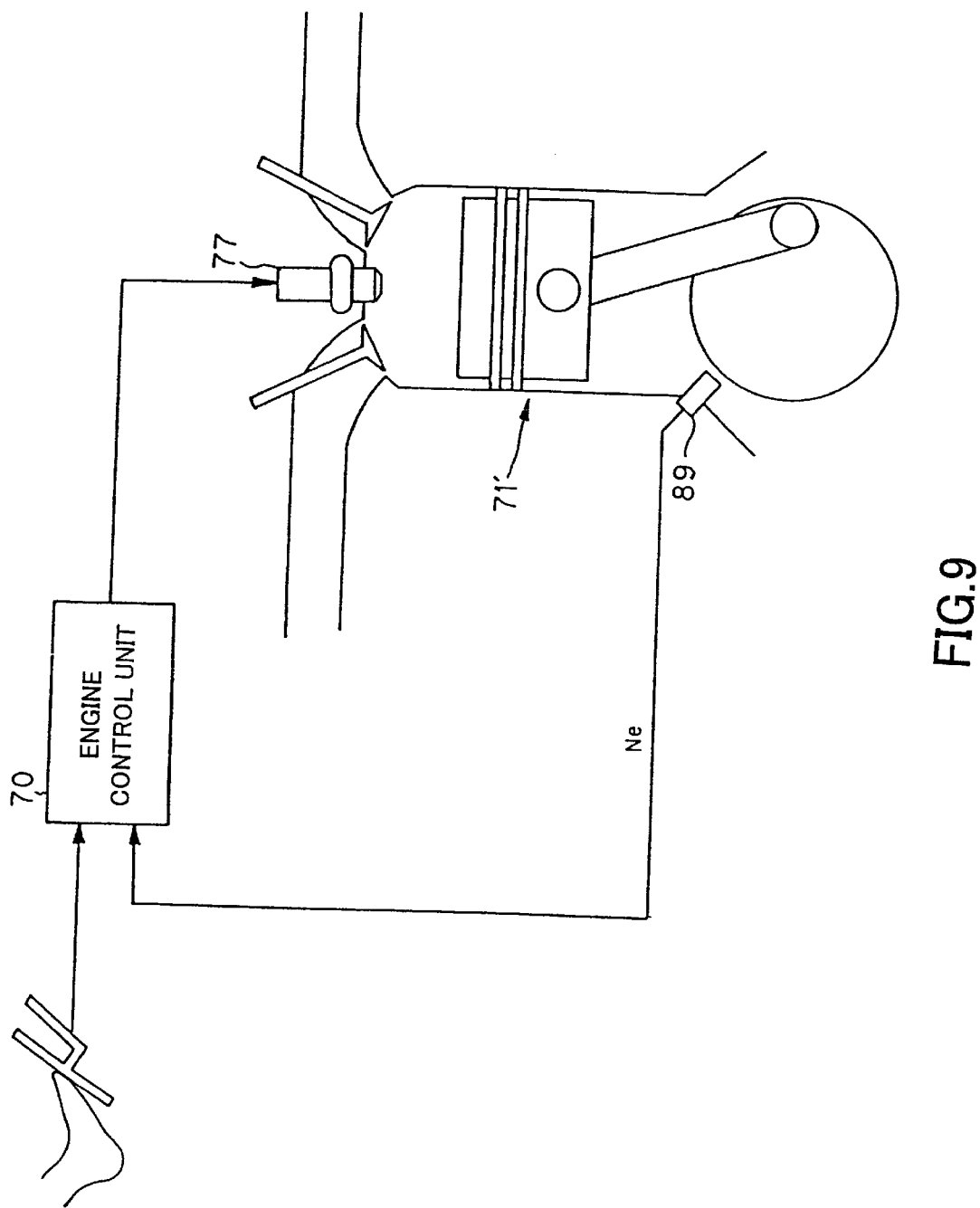
FIG. 9 is similar to FIG. 4, but showing a third embodiment, and is a diagram of the engine and engine control unit.
Figure 10:
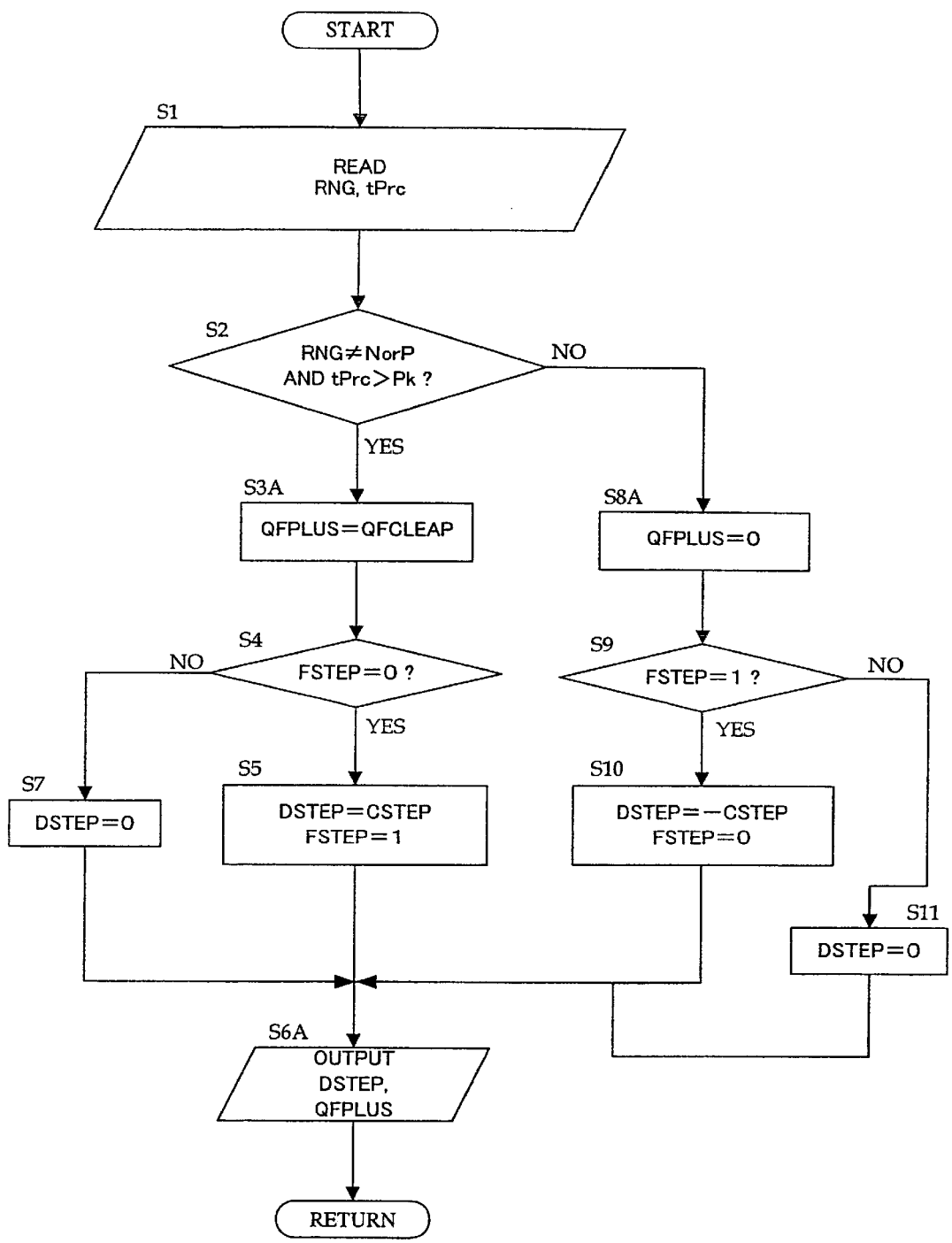
FIG. 10 is similar to FIG. 5, but is a flowchart showing an example of the control performed by the speed change control unit.
Figure 11:
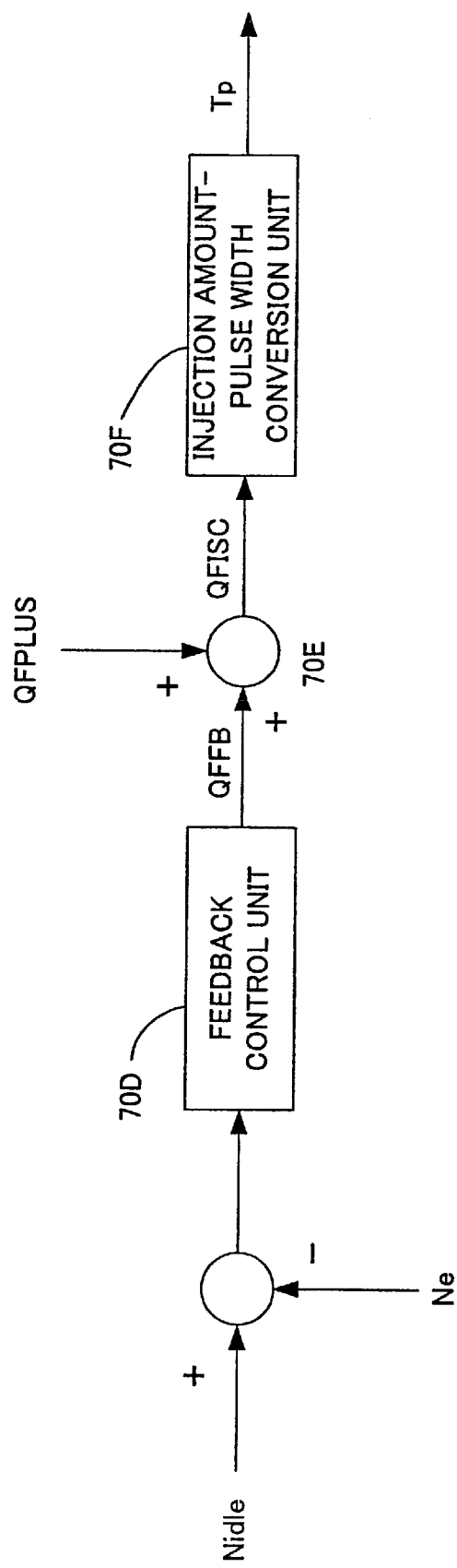
FIG. 11 is similar to FIG. 6, but is a block diagram showing an example of the control performed by the engine control unit.

FIG. 9 to FIG. 11 show a third embodiment wherein the engine 71 of the first embodiment is replaced by a direct injection internal combustion engine.

The engine 71' comprises an engine fuel injection valve 77 in a combustion chamber, and the engine control unit 70 determines a fuel injection amount Tp based on the accelerator pedal depression amount APS and engine rotation speed Ne.

In the flowchart of FIG. 10, the torque increase auxiliary air amount QAPLUS is replaced by a torque increase fuel correction amount QFPLUS in the steps S3, S6, S8 of the flowchart shown in FIG. 5 of the first embodiment, in respective new steps S3A, S6A, S8A. The remaining features of the construction are identical to those of the first embodiment.

In the step S3A, the torque increase fuel correction amount QFPLUS supplied to the engine control unit 70 is converted to the preset value QFCLEAP, and the engine torque is increased during the idle speed control so as to permit the vehicle to run under creep.

The preset value QFCLEAP is a fuel amount which a fuel injection amount QFISC from the fuel injection valve 77 during the idle speed control is a creep torque equivalent value, and the predetermined value QFCLEAP is a preset fixed value or a value found according to the running state, i.e. the slope on which the vehicle is traveling, etc.

In the engine control unit 70, if the accelerator pedal is released (accelerator pedal depression amount APS is 0), the idle speed control is performed by the feedback control unit 70D, addition unit 70E and injection amount-pulse width conversion unit 70F, as shown in FIG. 11.

The feedback control unit 70D computes an idle rotation speed feedback control fuel injection amount QFFB by feedback control so that the engine rotation speed Ne detected by the crank angle sensor 89 is the predetermined target idle rotation speed (Nidle).

The addition unit 70E outputs the result of adding the torque increase fuel correction amount QFPLUS from the speed change control unit 80 to the idle rotation speed feedback control fuel injection amount QFFB, as the idle rotation speed control total fuel correction amount QFISC.

The injection amount-pulse width conversion unit 70F determines a pulse width according to this idle rotation speed control total fuel injection amount QFISC, and drives the fuel injection valve 77.

During the idle speed control of the engine control unit 70, the engine torque can be rapidly generated due to the torque increase fuel correction amount QFPLUS from the speed change control unit 80.

In this case also, the engine torque generated by the direct injection engine 71' can be rapidly increased to the target creep torque by increasing the torque increase fuel correction amount QFPLUS simultaneously with the increase of transmitted torque. Consequently, even if the transmitted torque of the continuously variable transmission 2 is increased rapidly, engine stall is avoided, the vehicle can be started rapidly, and the performance of the vehicle comprising the infinite speed ratio continuously variable transmission can be enhanced.

Figure 12:
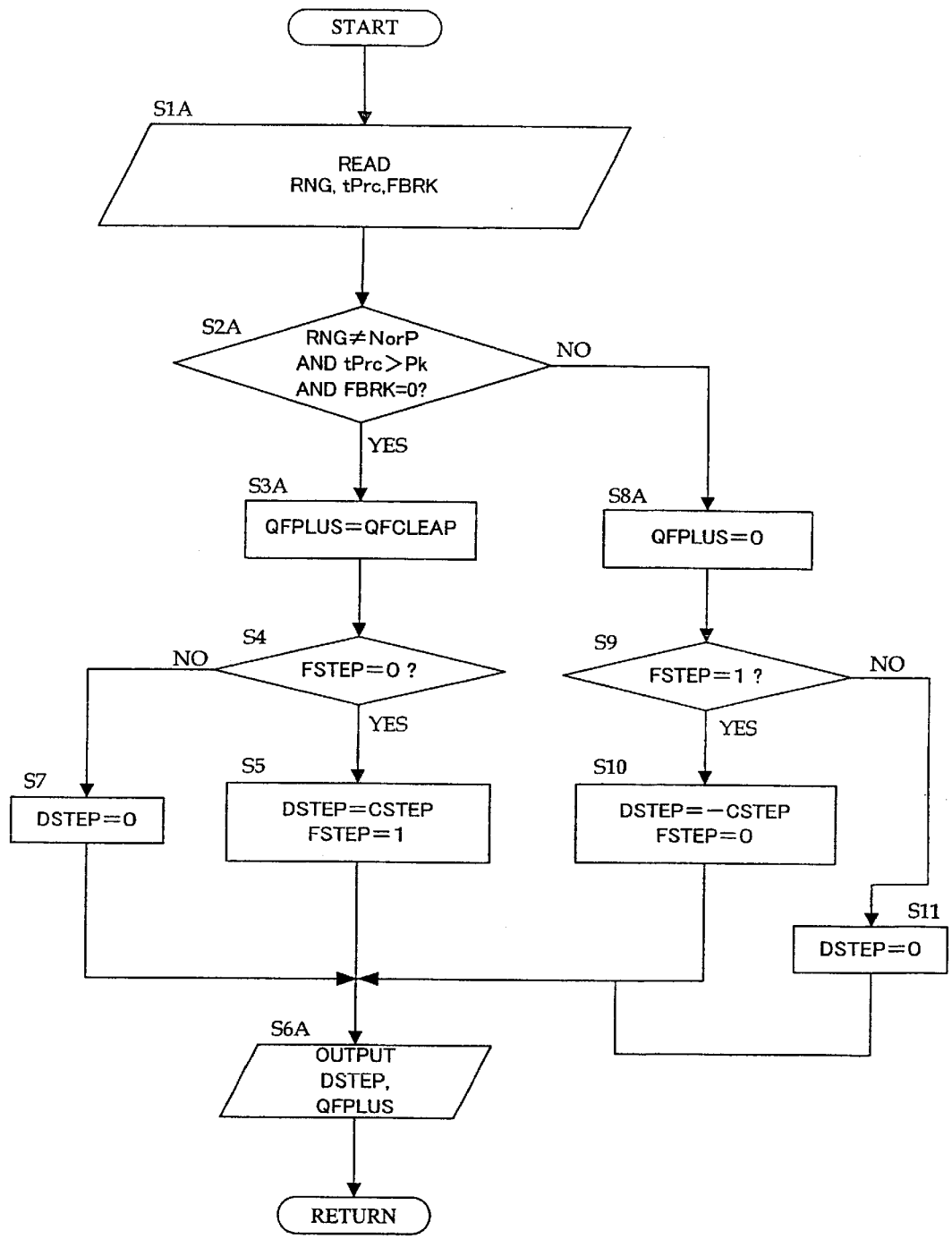
FIG. 12 is similar to FIG. 5, but is a flowchart showing a fourth embodiment.

FIG. 12 shows a fourth embodiment wherein the determination by the signal BRK from the brake switch 84 is added in the steps S1, S2 of the flowchart shown in FIG. 10 of the third embodiment, the remaining features of the construction being identical to those of the third embodiment.

In the step S1A, the select range, the oil pressure command value tPrc supplied to the power circulation mode clutch 9 and the brake operating flag FBRK based on the signal BRK from the brake switch 84, are read.

When the brake is operated, this brake operating flag FBRK is 1, otherwise it is set to 0.

In the step S2A, when the select range RNG is outside the N range or P range, the oil pressure command value tPrc is greater than the predetermined value Pk, and the brake operating flag FBRK is 0, the routine proceeds to drive processing under creep torque of the step S3A and subsequent steps. In other cases, the routine proceeds to processing of the step S8A and subsequent steps when the vehicle is stationary.

When the select lever selects a travel range, i.e., the D range or R range and the power circulation mode clutch 9 is engaged, the vehicle can start. However, it is determined whether or not the driver intends to start the vehicle by adding the determination of the brake operating flag FBRK.

When the brake operating flag FBRK is 1, and the vehicle has stopped when the brake has been operated, the driver does not intend to start the vehicle even if the D range or R range was selected, so superfluous generation of creep torque is prevented, and fuel cost-performance is enhanced.

When the direct injection engine 71' shown in the third and fourth embodiments is a gasoline engine, an electronically controlled throttle valve may be provided in the intake air passage, and the creep torque during the idle speed control may be controlled by controlling the opening of this throttle valve.

Figure 14:
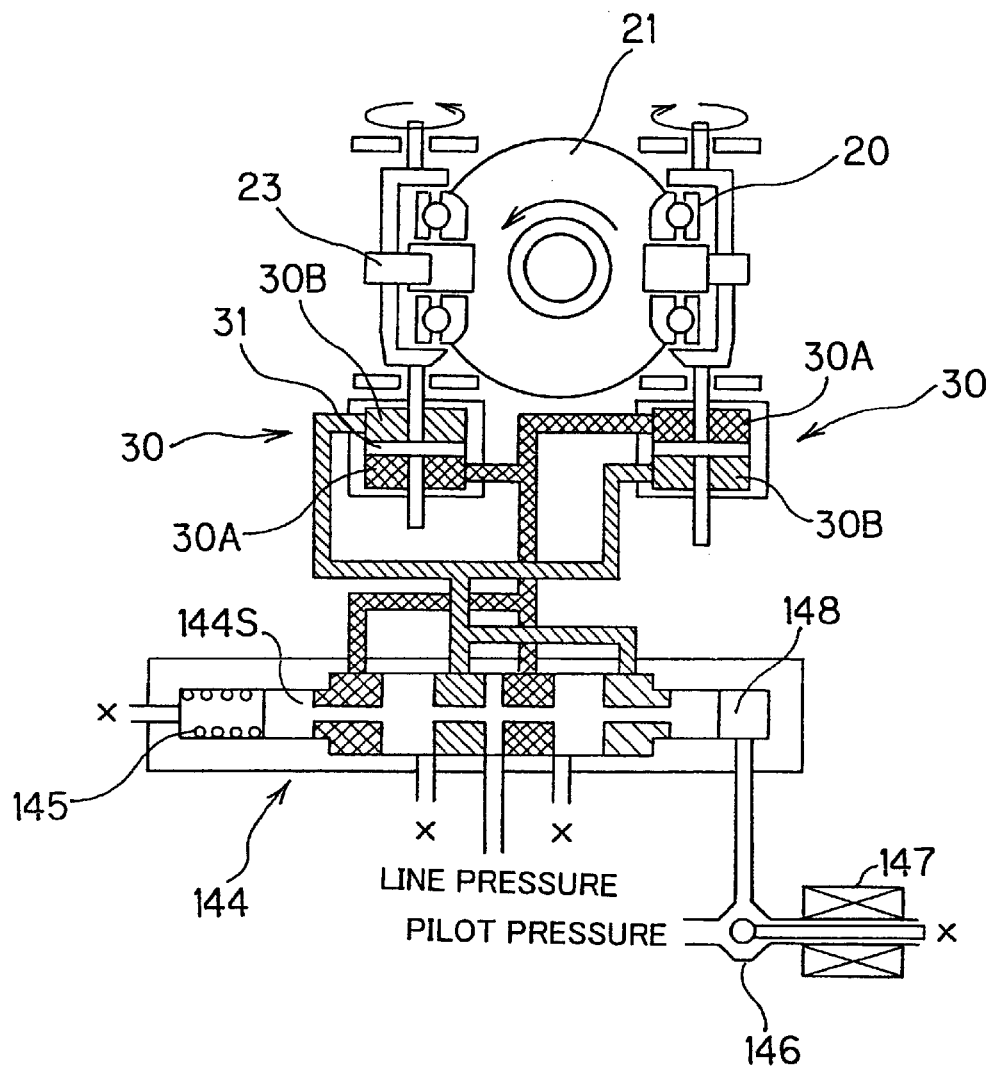
FIG. 14 is similar to FIG. 3, but is a diagram showing a toroidal continuously variable transmission according to a fifth embodiment.

Next, the embodiment shown in FIG. 14 and subsequent figures show an embodiment where control is performed to match the phase of the engine torque variation and the phase of the transmission torque capacity of the infinite speed ratio continuously variable transmission. By performing this control, engine stall or racing due to a difference in the two phases is prevented.

FIG. 14 shows mechanical components of the transmission torque control device of the continuously variable transmission of a fifth embodiment. The power rollers 20 are axially supported by trunnions 23 (power roller supporting members) of which the lower ends are joined to hydraulic cylinders 30, these trunnions being free to displace in an axial direction and rotate around the axis. At the lower end of one of the trunnions 23 of the plural trunnions 23, a differential pressure control valve 144 is provided which controls the axial displacement of the trunnion 23 and the gyration angle of the power roller 20 (rotation angle of the trunnion 23 converts into the real speed ratio).

As shown in FIG. 14, the hydraulic cylinders 30, 30 of the facing trunnions 23, 23 drive the trunnions 23, 23 in mutually opposite directions, so the positions of the oil chambers 30A, 30B formed by the piston 31 are reversed.

The oil chambers 30A, 30B of the hydraulic cylinders are respectively connected to the differential pressure control valve 144 which forms a speed ratio control mechanism. The differential pressure control valve 144 is partitioned into six oil chambers by a spool 144S, the oil chambers 30A, 30B being respectively connected alternately to the four middle oil chambers.

A spring 145 is disposed in one of the oil chambers situated at both ends. Due to the pushing force of this spring 145, the spool 144S is pushed in the direction of the other end. An oil pressure acts on an other oil chamber 148 at the other end, and the oil pressure is controlled via a pressure control valve 146 comprising a solenoid 147 which forms a speed ratio control mechanism. When this oil pressure is a pilot pressure, it balances the pushing force of the spring 145.

When the duty ratio of the solenoid 147 is varied, the oil pressure of the oil chamber 148 varies, the spool 144S of the differential pressure control valve 144 displaces, and the piston 31 of the hydraulic cylinder 30 displaces. As a result, the axial displacement amount of the trunnion 23 and the gyration angle of the power roller 20 are controlled.

The engine 71 is controlled by an engine control unit 100, the details of this control being identical to those shown in FIG. 4.

Figure 15:
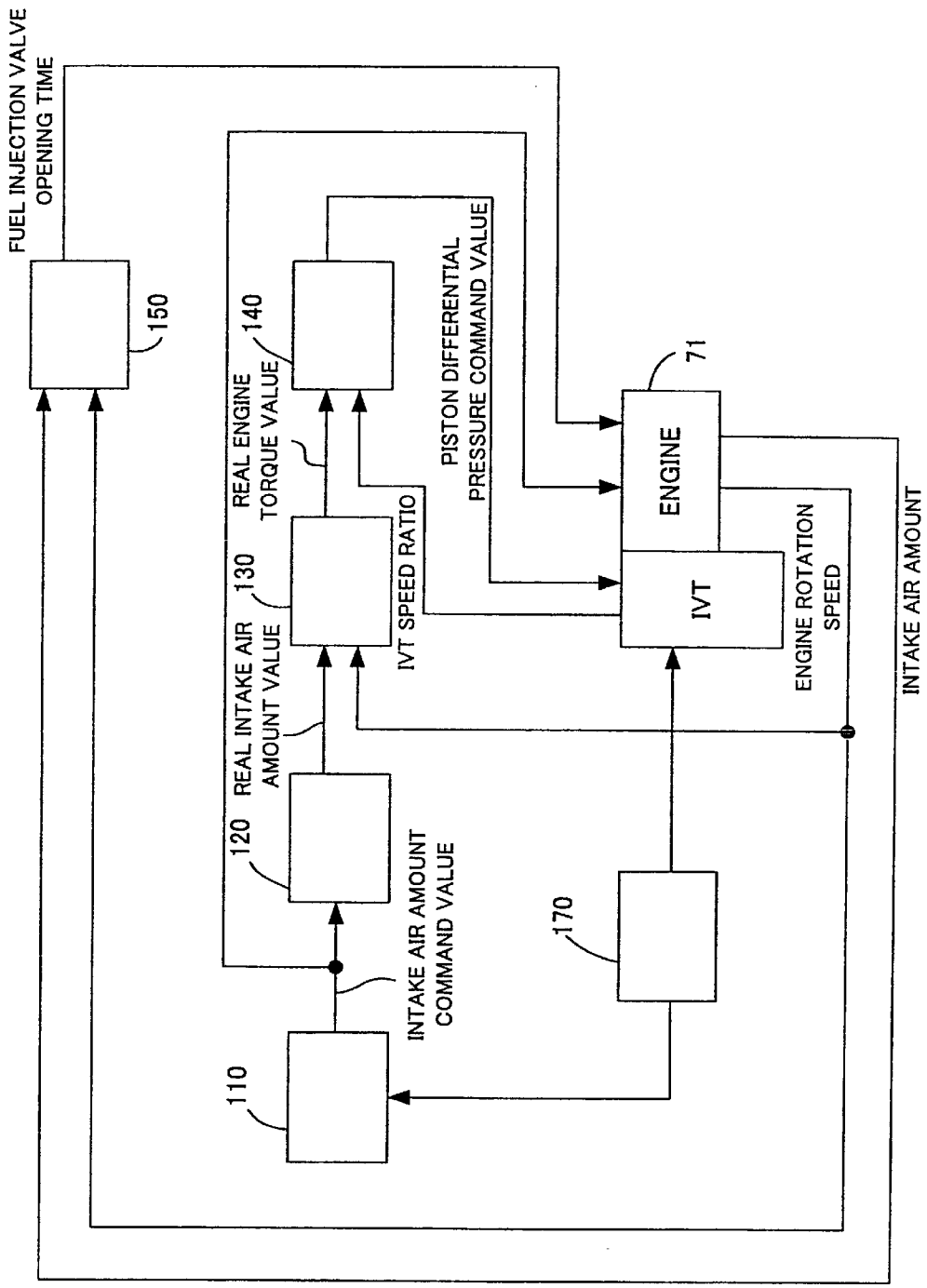
FIG. 15 is a block diagram showing the construction of the control device of the fifth embodiment.

FIG. 15 is a block diagram showing the construction of the speed change control unit of this embodiment.

An intake air amount control device 110 inputs the accelerator pedal depression amount APS or the output of a running range selection device 170 described later, and an intake air amount is computed based on the required engine torque. The intake air amount control device 110 outputs this intake air amount as an intake air amount command value to the engine 71 and a real intake air amount computing device 120.

The real intake air amount computing device 120 computes a real intake air amount with the intake air amount command value as input value based on the intake delay of the engine 71, and outputs this to a real engine torque estimating device 130.

The real engine torque estimating device 130, which is an engine torque estimating device, computes a real engine torque estimated value from the real intake air amount and the engine rotation speed output by the engine, and outputs this to a piston differential pressure control device 140.

The piston differential pressure control device 140, which is a transmitted torque control device, computes a piston differential pressure command value based on the real engine torque estimated value and a speed ratio output by the infinite speed ratio continuously variable transmission (ratio of output rotation speed to input rotation speed, the inverse of the speed ratio), and outputs the differential pressure command value to the infinite speed ratio continuously variable transmission. When a running range selection device 170 which sets the running range, performs a range change-over from the neutral range to the forward range or reverse range, a solenoid 47 to which the piston differential pressure command value is input varies the duty ratio, and controls the differential pressure control valve 144 to a piston differential pressure corresponding to the piston differential pressure command value. Here, running range includes the forward range and reverse range where the power of the engine is transmitted to the unit output shaft, and the neutral range where the power of the engine is not transmitted to the unit output shaft. Simultaneously, when the running range selection device 170 performs a range change-over from the neutral range to the forward or reverse range, a control command is performed to increase or decrease the intake air amount so as to vary the engine torque supplied to the intake air amount control device 110.

At the same time, the engine rotation speed output by the engine and intake air amount are input to a fuel injection amount control device 150. The fuel injection amount control device 150 computes a fuel injection amount so that an air-fuel ratio is constant based on these input values, and outputs a fuel injection valve opening timing to the engine.

Figure 16:
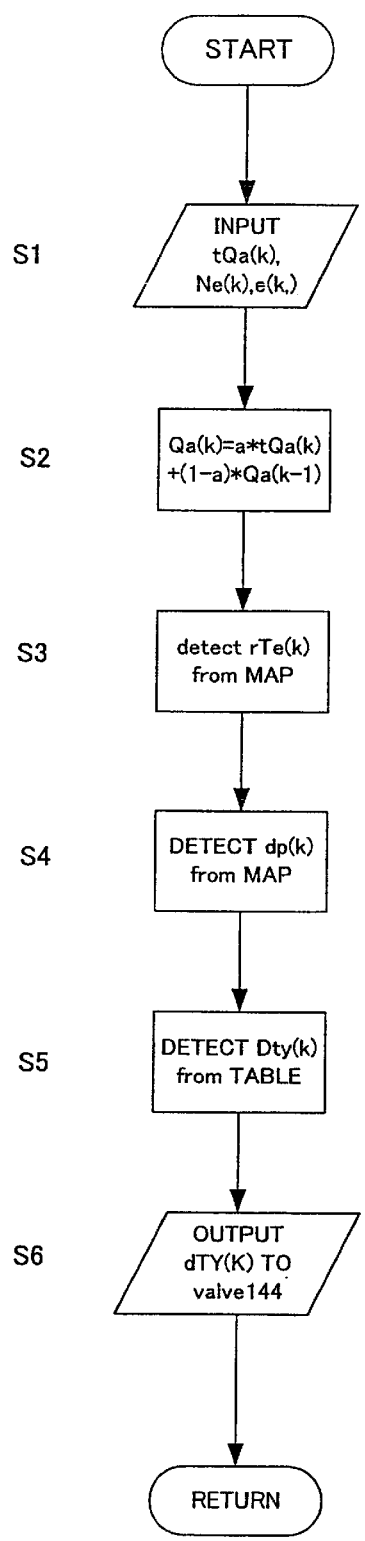
FIG. 16 is a flowchart showing an example of a control sequence according to the fifth embodiment.

FIG. 16 is a flowchart showing the control sequence of this embodiment. This is computed repeatedly at a predetermined interval of, for example, 10 milliseconds. (k) in the figure shows various values at this calculating time, and (k−1) shows various values at the time of the immediately preceding calculation.

First, in a step S1, an intake air amount command value tQa(k) output by the intake air amount control device 110, an engine rotation speed Ne(k) of the engine 71, and a speed ratio e(k) of the infinite speed ratio continuously variable transmission (IVT), are read by the real intake air amount computing device 120.

In a step S2, the real intake air amount computing device 120 estimates the real intake air amount by performing a first order delay approximation to the intake air amount command value. The real intake air amount estimation value Qa(k) on the present occasion is calculated by the following equation from the intake air amount estimation value tQa(k) on the present occasion and the real intake air amount estimation value Qa(k−1) on the immediately preceding occasion.

$$Qa(k)=A \times tQa(k)+(1-A) \times Qa(k-1)$$

Here, A is a weighting coefficient, and is a value lying in the range 0<A<1, e.g. 0.2.

Figure 17:
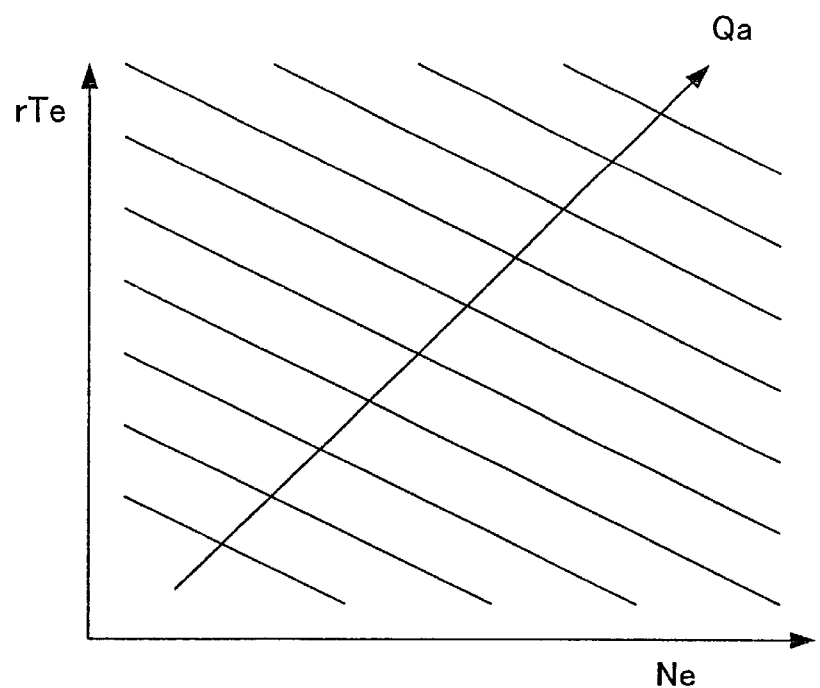
FIG. 17 is an engine torque map of a gasoline engine according to the fifth embodiment.

In a step S3, a real engine torque estimation value rTe(k) is looked up from an engine torque map shown in FIG. 17 using the real intake air amount estimation value Qa(k) and engine rotation speed Ne(k) as parameters, and the real engine torque estimation device 130 outputs the real engine torque estimation value rTe(k).

The real engine torque estimation value rTe and engine rotation speed Ne have an inversely proportional relation. The larger the real intake air amount estimation value Qa, the larger the real engine torque estimation value rTe.

Figure 18:
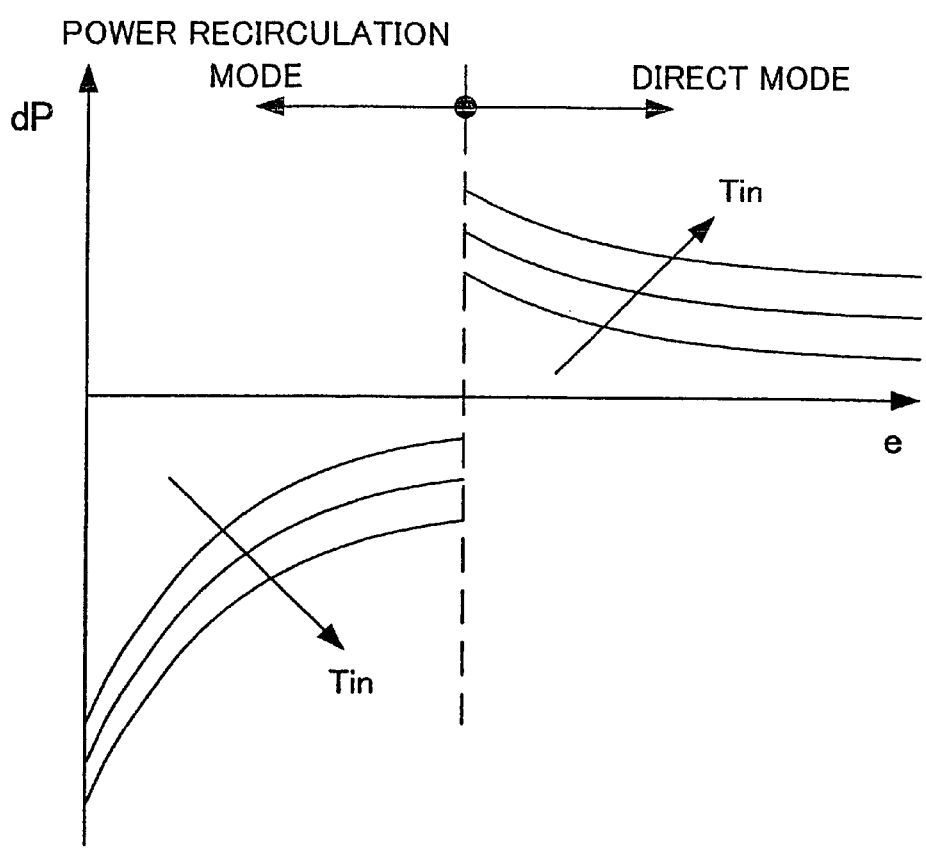
FIG. 18 is a piston pressure difference map according to the fifth embodiment.

In a step S4, in order to make an IVT transmission torque capacity Tin coincide with the real engine torque estimation value rTe(k), a piston differential pressure command value dP(k) is looked up from a map shown in FIG. 18 with the IVT speed ratio e(k) and the real engine torque estimation value rTe(k) as parameters. The piston differential pressure command value dP(k) is output by the piston differential pressure control device 140.

The piston differential pressure command value changes from a negative value to a positive value at the change-over from the power circulation mode to the direct mode (rotation synchronous point, RSP). This means that the flow of power changes direction, from output side to input side, to input side to output side, when viewed from the input/output disks. The IVT transmission torque capacity Tin also shows a tendency to increase the larger the absolute value of the piston differential pressure command value dP.

Figure 19:
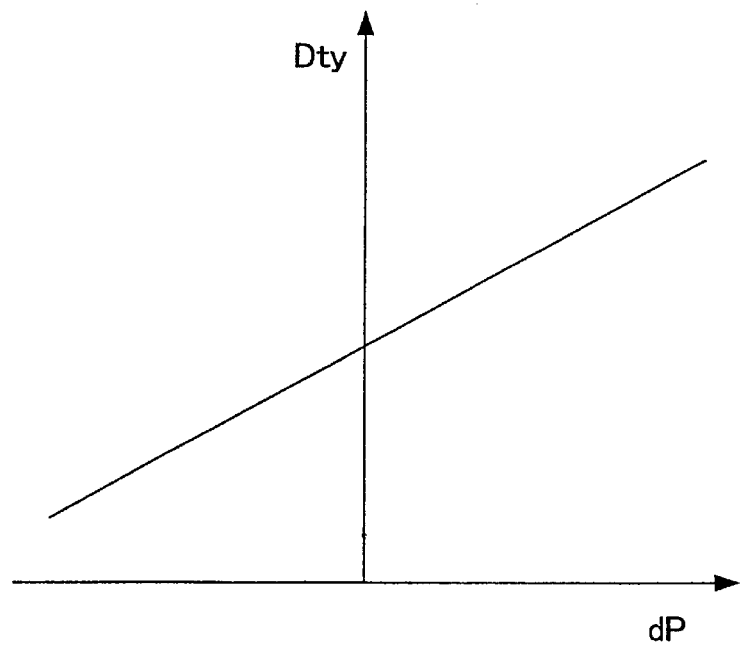
FIG. 19 is a duty ratio table of a piston pressure difference control duty valve according to the fifth embodiment.

In a step S5, the duty ratio of the piston differential pressure control valve 144 is looked up from a map shown in FIG. 19 with the differential pressure command value dP(k) as a parameter, and a duty command value Dty(k) is computed.

The duty command value Dty has a directly proportional relation in which it is larger, the larger the piston differential pressure command value dP shown in FIG. 19.

In a step S6, the duty command value Dty(k) is output to the piston differential pressure control valve 144.

Due to this construction, the intake air amount for computing the engine torque is a real intake air amount estimation value which takes account of the phase delay. From this, the real engine torque estimation value can be calculated, so an engine torque which takes account of the phase delay can be computed. Further, the piston differential pressure command value supplied to the piston differential pressure control valve 144 which controls the transmission torque of the continuously variable transmission, is determined.

Therefore, the phase of the transmission torque capacity variation of the continuously variable transmission can be made to coincide with the phase of the engine torque variation, and engine stall or racing resulting from a discrepancy in the two phases can be prevented.

The piston differential pressure command value is output as a command value which takes account of the phase of the engine torque variation supplied to the piston differential pressure control valve 144 which controls the transmission torque capacity of the continuously variable transmission. Therefore, the transmission torque capacity of the infinite speed ratio continuously variable transmission can be precisely controlled.

Further, as the phase of the engine torque variation is estimated from the command value of the intake air amount control device 110, it can easily be applied to a gasoline engine.

Figure 20:
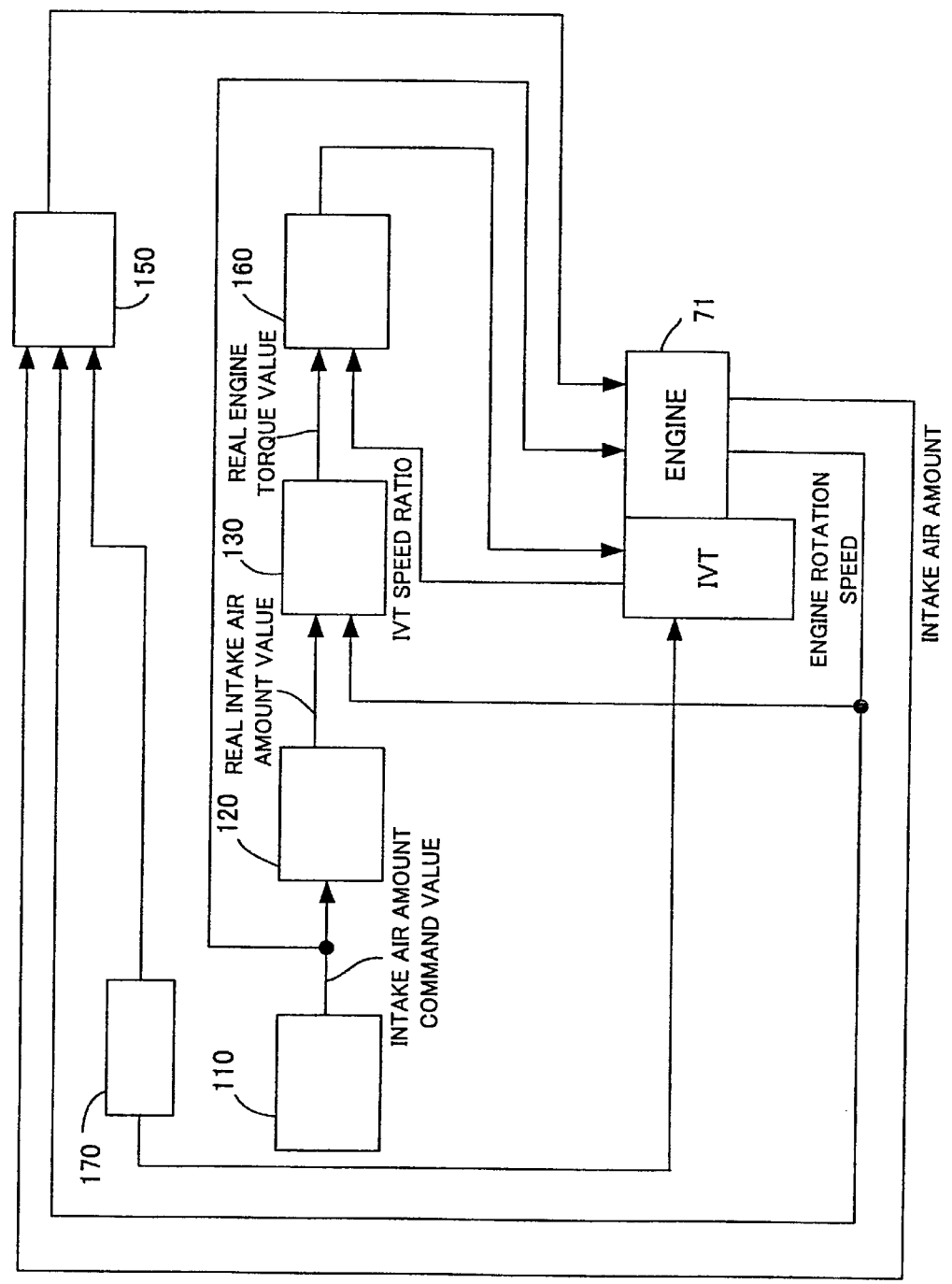
FIG. 20 is similar to FIG. 15, but is a block diagram showing the construction of a control device according to a sixth embodiment.

FIG. 20 shows a block diagram of the construction of a speed ratio control unit according to a sixth embodiment. The mechanical components of this embodiment are identical to the mechanical components of the transmission torque control device of the continuously variable transmission in the first embodiment shown in FIG. 3, but a servo valve 46 is used instead of the differential pressure control valve 144 of the fifth embodiment.

A step motor control device 160 is used instead of the piston pressure differential control device 140 in the construction of the fifth embodiment shown in FIG. 15.

The intake air amount control device 110 computes the intake air amount based on the required engine torque calculated from the accelerator pedal depression amount APS and the output of a running range selection device 170, described later. The intake air amount is also output to the engine 71 and real intake air amount computing device 120 as an intake air amount command value.

The real intake air amount computing device 120 computes the real intake air amount based on the intake air amount command value, and outputs this to the real engine torque estimation device 130.

The real engine torque estimation device 130, which is an engine torque estimation device, computes the real engine torque estimation value from the real intake air amount and the engine rotation speed output by the engine, and outputs this to the step motor control device 160.

The step motor control device 160, which is a transmission torque control device, controls the step motor 36 when the running range selection device 170 performs a range change-over from the neutral range to the forward range or reverse range based on the real engine torque estimation value and the speed ratio (ratio of output rotation speed to input rotation speed, which is the inverse of the speed ratio) output by the infinite speed ratio continuously variable transmission. When a range change-over is performed from the neutral range to the forward range or reverse range, the running range selection device 170 output the control signal to increase or decrease the intake air amount so as to increase or decrease the engine torque to the intake air amount control device 110.

At the same time, the engine rotation speed output by the engine and intake air amount are input to the fuel injection amount control device 150. The fuel injection amount control device 150 computes a fuel injection amount based on these input values, and outputs a fuel injection valve opening time to the engine.

Figure 21:
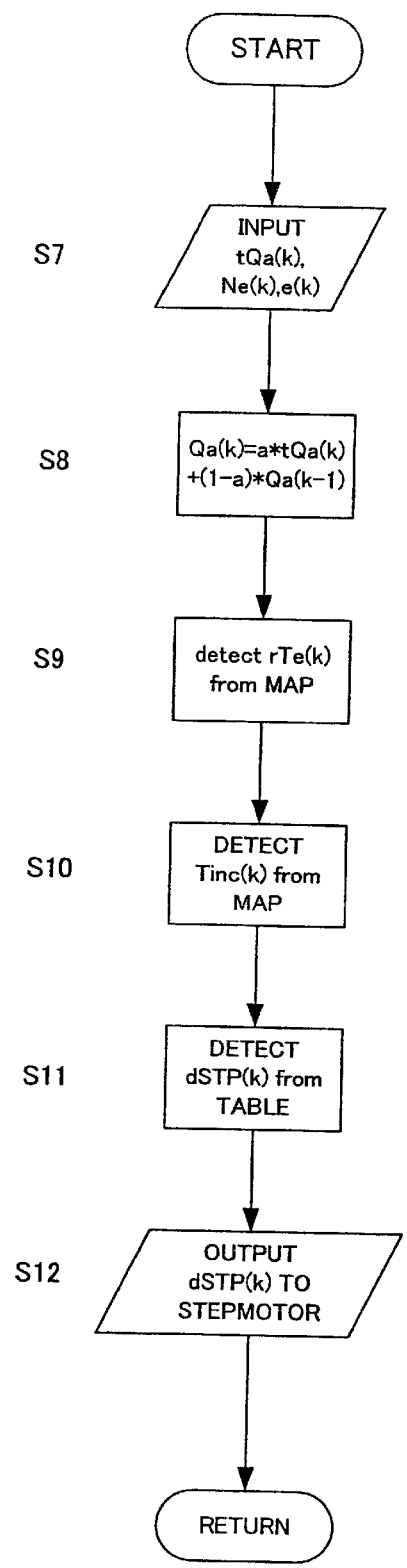
FIG. 21 is similar to FIG. 16, but is a flowchart showing an example of a control sequence according to the sixth embodiment.

FIG. 21 is a flowchart showing the control sequence of this embodiment. This is computed repeatedly at a predetermined interval of, for example, 10 milliseconds. (k) in the figure shows various values at this calculating time, and (k−1) shows various values and the time of the immediately preceding calculation, which is identical to the fifth embodiment.

First, in a step S7, an intake air amount command value tQa(k) output by the intake air amount control device 110, the engine rotation speed Ne (k) of the engine 71, and the speed ratio e(k) of the infinite speed ratio continuously variable transmission (IVT), are read by the real intake air amount computing device 120.

In a step S8, the real intake air amount computing device 120 estimates the real intake air amount by performing a first order delay approximation to the intake air amount command value. The real intake air amount estimation value Qa(k) on the present occasion is calculated by the following equation from the intake air amount estimation value tQa(k) on the present occasion and the real intake air amount estimation value Qa(k−1) on the immediately preceding occasion.

$$Qa(k)=A \times tQa(k)+(1-A) \times Qa(k-1)$$

Here, A is a weighting coefficient, and is a value lying in the range 0<A<1, e.g. 0.2. In a step S9, the real engine torque estimation value rTe(k) is looked up from an engine torque map shown in FIG. 17 using the real intake air amount estimation value Qa(k) and engine rotation speed Ne(k) as parameters, and the real engine torque estimation device 130 outputs the real engine torque estimation value rTe(k).

The steps S7 to S9 are identical to the steps S1 to S3 of the fifth embodiment.

Figure 22:
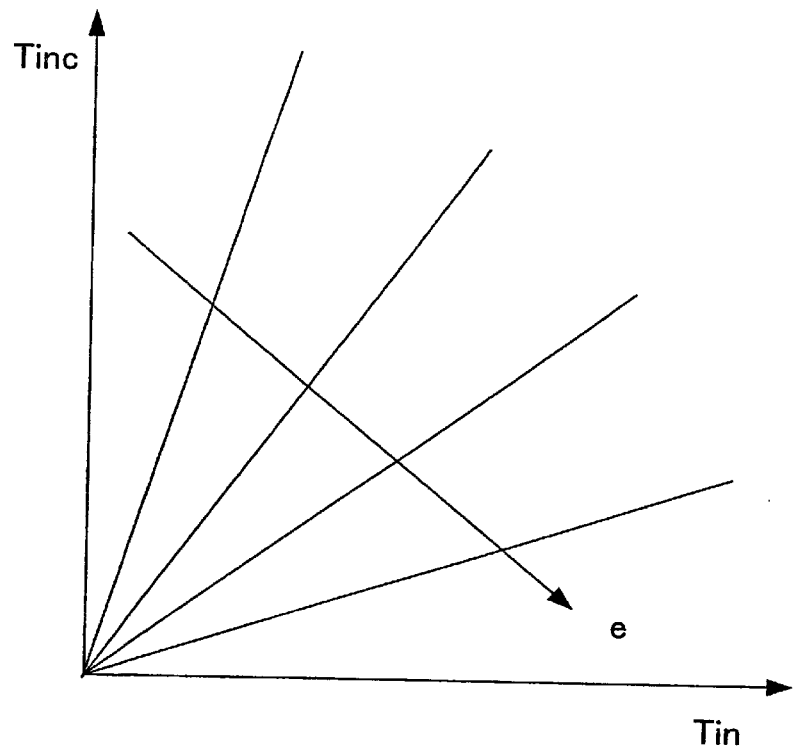
FIG. 22 is a map of the transmitted torque of the continuously variable transmission.

In a step S10, a transmission torque Tinc(k) of the continuously variable transmission is looked up from a map shown in FIG. 22 with the IVT speed ratio e(k) and real engine torque estimation value as parameters in order to make the IVT transmission torque capacity Tin coincide with the real engine torque estimation value rTe(k). The transmission torque Tinc(k) of the continuously variable transmission is then output by the step motor control device 160.

The IVT transmission torque capacity Tin and transmission torque Tinc of the continuously variable transmission have a directly proportional relation, as shown in FIG. 22. Its slope decreases the larger the IVT speed ratio e.

Figure 23:
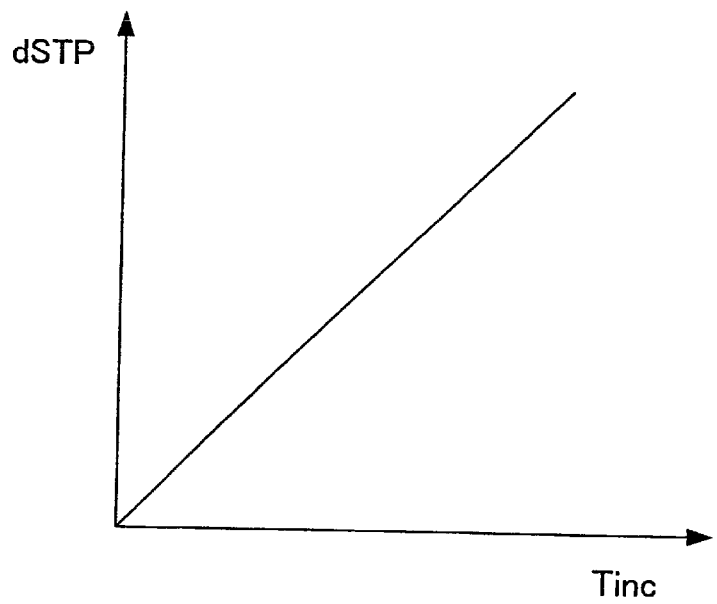
FIG. 23 is a step motor operating amount table of a speed ratio servo mechanism.

In a step S11, a step motor operating amount dSTP(k) is looked up from a map shown in FIG. 23 with the transmission torque Tinc(k) of the continuously variable transmission as a parameter.

The transmission torque Tinc(k) of the continuously variable transmission and the step motor operating amount dSTP(k) have a directly proportional relation as shown in FIG. 23.

In a step S12, the step motor operating amount dSTP(k) is output to the step motor 36.

Due to this construction, the operating amount of the step motor 36 which controls the speed ratio of the continuously variable transmission is made to coincide with the phase of the engine torque variation. Therefore, the transmission torque capacity can be controlled even in an infinite speed ratio continuously variable transmission comprising a step motor functioning as a speed ratio servo mechanism which servo controls the speed ratio without providing a mechanism to directly control the oil pressure of the continuously variable transmission.

Figure 24:
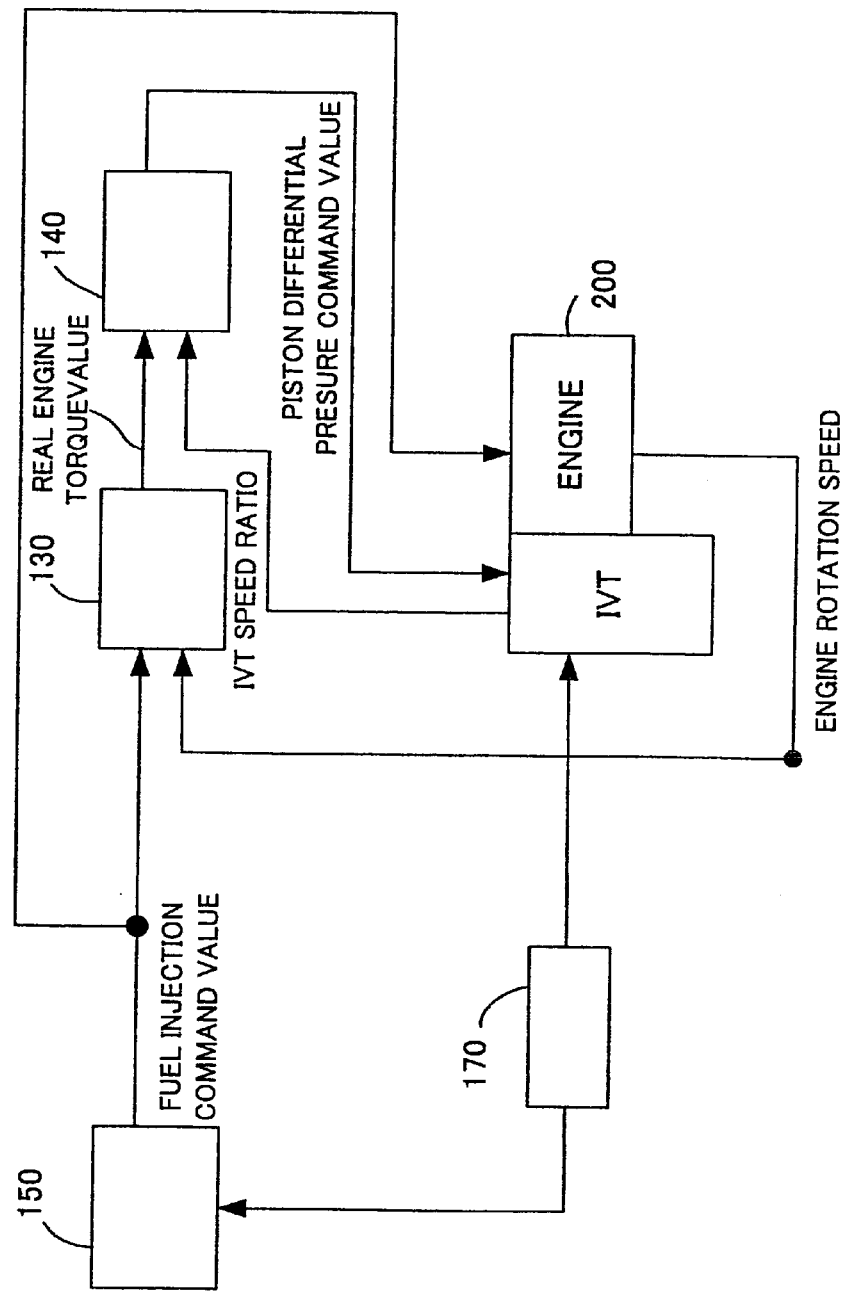
FIG. 24 is similar to FIG. 15, but is a block diagram showing the construction of a control device according to a seventh embodiment.

FIG. 24 shows a block diagram of the construction of a speed ratio control unit of a diesel engine as a seventh embodiment. The mechanical construction of the diesel engine is identical to that of the cylinder injection engine shown in FIG. 9.

The fuel injection amount control device 150 computes a fuel injection amount based on the accelerator pedal depression amount APS and the output of the running range selection device 170 described later. This fuel injection amount is output to the engine and real engine torque estimation device 130 as a fuel injection amount command value. The real engine torque estimation device 130 computes a real engine torque estimation value based on the engine rotation speed output by the engine and fuel injection amount command value, and outputs this to the piston differential pressure control device 140. The piston differential pressure control device 140 computes a piston differential pressure command value from the real engine torque estimation value and speed ratio output by the infinite speed ratio continuously variable transmission, and outputs the piston differential pressure command value to the infinite speed ratio continuously variable transmission. When the running range selection device 170 changes over from the neutral range to the forward range or reverse range, a solenoid 147 to which the piston differential pressure command value is input varies the duty ratio, and controls the differential pressure control valve 144 to obtain a piston differential pressure corresponding to the piston differential pressure command value. Simultaneously, when the running range selection device 170 changes over from the neutral range to the forward range or reverse range, a control command is performed to increase or decrease the fuel injection amount so as to increase or decrease the engine torque relative to the fuel injection amount control device 150.

Figure 25:
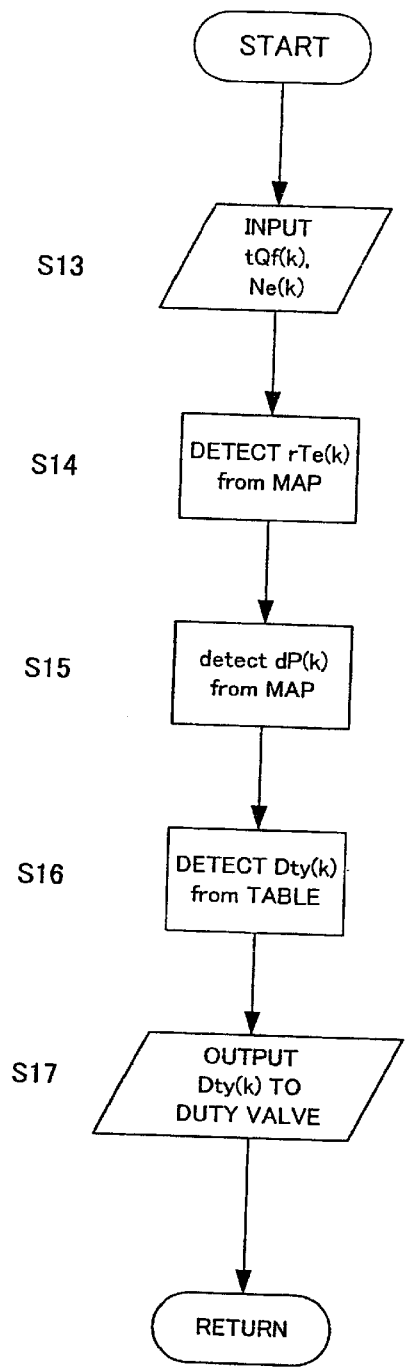
FIG. 25 is similar to FIG. 16, but is a flowchart showing an example of a control sequence according to the seventh embodiment.

FIG. 25 is a flowchart showing a control sequence of this embodiment. This is computed repeatedly at an interval of, for example, 10 milliseconds. (k) in the figure shows various values at this calculating time as in the case of the first embodiment.

In a step S13, the real engine torque estimation device 130 reads a fuel injection amount command value tQf(k) output by the fuel injection control device, engine rotation speed Ne(k) and speed ratio e(k) of the infinite speed ratio continuously variable transmission.

Figure 26:
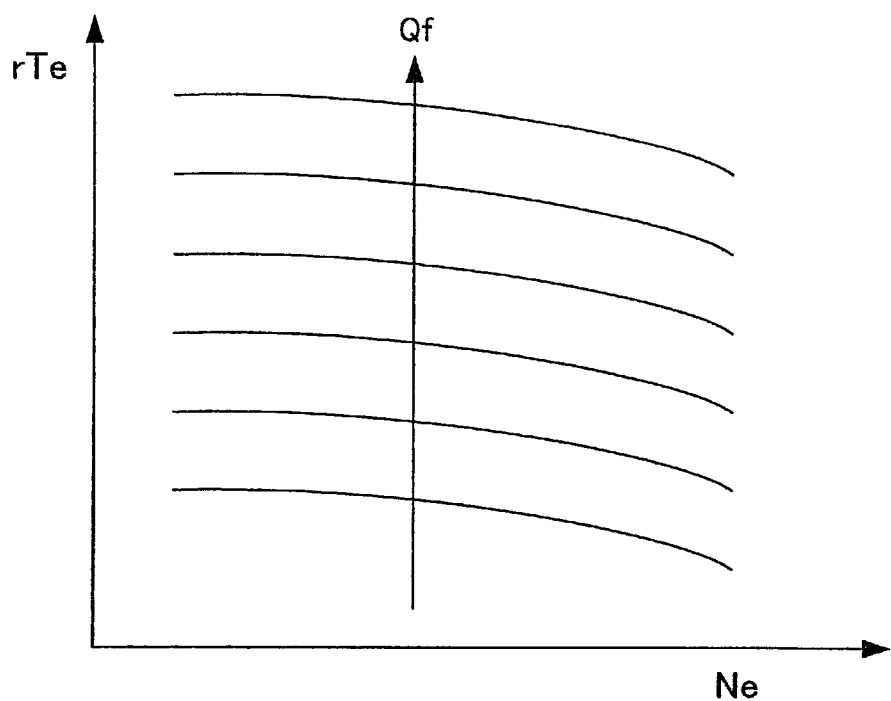
FIG. 26 is an engine torque map of a diesel engine.

In a step S14, an engine torque map shown in FIG. 26 is looked up with the fuel injection amount command value tQf(k) and engine rotation speed Ne (k) as parameters. The real engine torque estimation device 130 computes the real engine torque estimation value rTe(k).

An engine torque Te and the engine rotation speed Ne have a gentle downward sloping relation, as shown in FIG. 26. The larger the fuel injection amount Qf, the larger the engine torque Te relative to the engine rotation speed Ne.

In the step S15, the piston differential pressure command value dP(k) is looked up from a map shown in FIG. 18 with the IVT speed ratio e(k) and real engine torque estimation value rTe(k) as parameters, in order to make the IVT transmission torque capacity Tin coincide with the real engine torque estimation value rTe(k). The piston differential pressure control device 140 outputs the piston differential pressure command value dP(k).

In a step S16, the duty ratio of the piston differential pressure control valve 144 is looked up from a map shown in FIG. 19 with the piston differential pressure command value dP(k) as a parameter, and the duty command value Dty(k) is computed.

In a step S17, the duty command value Dty(k) is output to the piston differential pressure control valve 144.

The steps from the step S15 to the step S17 are identical to the steps from the step S4 to the step S6.

Due to this construction, the phase of the engine torque variation can be estimated from the fuel injection amount, and it can be easily applied to a diesel engine or a direct injection gasoline engine which performs stratified superfine combustion.

Figure 27:
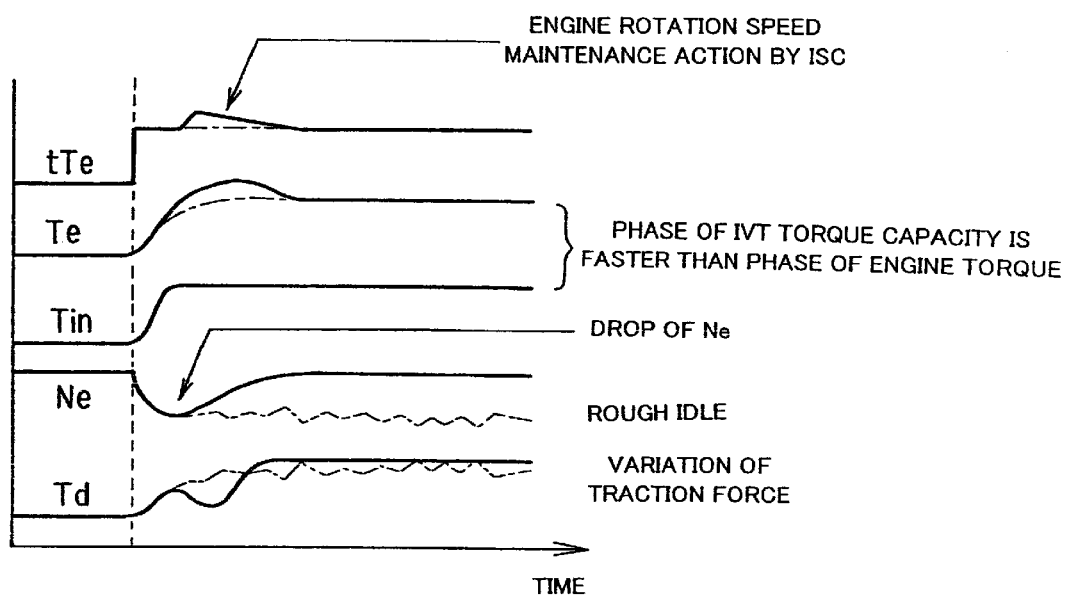
FIG. 27 is a diagram showing the behavior of various parameters based on the control which this invention is not adopted.
Figure 28:
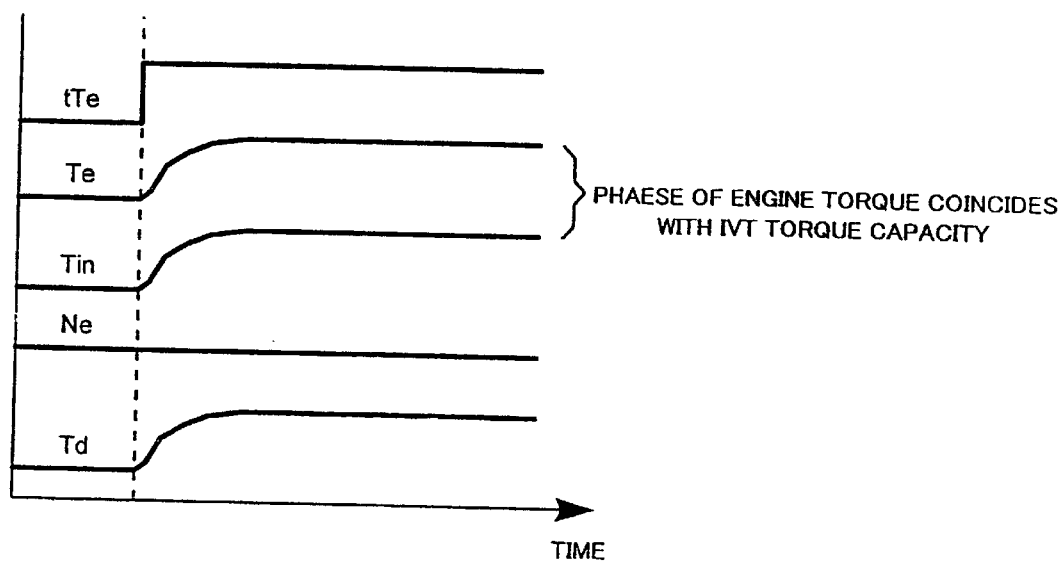
FIG. 28 is a diagram showing the behavior of various parameters based on the control according to this invention.

FIGS. 27, 28 show the behavior when the transmission torque capacity Tin of the continuously variable transmission, engine rotation speed Ne and a drive force Td are controlled. FIG. 27 shows the control which this invention is not adopted, and FIG. 28 shows the control according to this invention. This shows the behavior when the engine is in the idle state, and the infinite speed ratio continuously variable transmission shifts from the GNP state to a creep running state.

In the control shown in FIG. 27, the phase of the transmission torque capacity variation of the infinite speed ratio continuously variable transmission is earlier than the phase of the engine torque variation, so the engine rotation speed falls. If an idle speed control unit (ISC) operates, an engine rotation speed maintenance action is performed according to the drop of engine rotation speed and the engine rotation speed is restored, but the initial fall of engine rotation speed cannot be avoided. The drive force then varies according to this rotational fluctuation. If the ISC does not operate (shown by the dot and dash line in the figure), the engine rotation speed is maintained below the idle rotation speed, the rotational fluctuation increases and the drive force also fluctuates.

In the control of this invention shown in FIG. 28 on the other hand, the phase of the engine torque variation is made to coincide with the phase of the transmission torque capacity variation of the infinite speed ratio continuously variable transmission, so a fluctuation of the engine rotation speed does not occur, and drive force also increases smoothly.

The contents of Japanese Application No. 2000-70096, with a filing date Mar. 14, 2000, and Japanese Application No. 2000-251125, with a filing date Aug. 22, 2000, are hereby incorporated by reference.

The embodiments of this invention in which an exclusive property or privilege is claimed are defined as follows:

What is claimed is:

1. A drive force control system for a vehicle, the vehicle comprising an engine, a continuously variable transmission having a first output shaft and transmitting a rotation of the engine at an arbitrary speed ratio to the first output shaft, a fixed speed ratio transmission having a second output shaft and transmitting the rotation of the engine at a fixed speed ratio to the second output shaft, a planetary gear set having a first rotation element joined to the first output shaft, a second rotation element joined to the second output shaft, and a third rotation element which varies a rotation direction and a rotation speed according to a difference between a rotation speed of the first rotation element and a rotation speed of the second rotation element, the vehicle running according to the rotation of the third rotation element, a selector lever which selects an operating range, the operating range comprising a travel range and a non-travel range, and a power recirculation mode clutch which connects and disconnects the second rotation element and the second output shaft, the system comprising:

a sensor which detects the operating range;

a first mechanism which increases an output torque of the engine;

a second mechanism which increases a torque transmitted by the continuously variable transmission; and a microprocessor programmed to:

determine if the engine rotation speed is equal to a predetermined idle rotation speed;

determine if the operating range has changed over from the non-travel range to the travel range;

control the first mechanism to increase the output torque of the engine and control the second mechanism to increase the torque transmitted by the continuously variable transmission and engage the power recirculation mode clutch, when the operating range has changed over from the non-travel range to the travel range.

2. The vehicle drive force control system as defined in claim 1, wherein the microprocessor is further programmed to prevent the first mechanism from increasing the output torque of the engine and prevent the second mechanism from increasing the torque transmitted by the continuously variable transmission, when the power recirculation mode clutch is not connecting the second rotation element and the second output shaft.

3. The vehicle drive force control system as defined in claim 1, wherein the vehicle further comprises a brake, the system further comprises a sensor which detects if the brake is operating, and the microprocessor is further programmed to prevent the first mechanism from increasing the output torque of the engine and prevent the second mechanism from increasing the torque transmitted by the continuously variable transmission, when the brake is operating.

4. The vehicle drive force control system as defined in claim 1, wherein the engine comprises a throttle which adjusts an intake air amount of the engine, and the microprocessor is further programmed to control the throttle to increase the intake air amount when the microprocessor controls the first mechanism to increase the output torque of the engine.

5. The vehicle drive force control system as defined in claim 1, wherein the first mechanism comprises a fuel injector which injects fuel in the engine, and the microprocessor is further programmed to control the injector to increase a fuel injection amount to increase the output torque of the engine.

6. The vehicle drive force control system as defined in claim 1, wherein the system further comprises a sensor which detects an output torque of the engine, and the microprocessor is further programmed to control the second mechanism to increase the torque transmitted by the continuously variable transmission in synchronism with an increase of the output torque of the engine.

7. The vehicle drive force control system as defined in claim 6, wherein the engine comprises an intake passage, the first mechanism comprises a throttle provided in the intake passage, and the microprocessor is further programmed to increase the output torque of the engine by outputting an intake air amount command signal to the throttle to increase an intake air amount of the engine, and wherein the engine output torque detecting sensor comprises the microprocessor which is further programmed to estimate a real intake air amount of the engine by applying a first order delay processing to the intake air amount command signal and calculate the engine output torque based on the real intake air amount.

8. The vehicle drive force control system as defined in claim 7, wherein the system further comprises a sensor which detects a rotation speed of the engine, and the microprocessor is further programmed to calculate the engine output torque based on the real intake air amount and the rotation speed of the engine.

9. The vehicle drive force control system as defined in claim 7, wherein the first mechanism further comprises a fuel injector and the microprocessor is further programmed to control the injector to increase a fuel injection amount as the real intake air amount increases.

10. The vehicle drive force control system as defined in claim 6, wherein the second mechanism comprises a piston which, according to a hydraulic pressure, regulates the torque transmitted by the continuously variable transmission, and the microprocessor is further programmed to control the second mechanism to increase the hydraulic pressure in synchronism with the increase of the output torque of the engine.

11. The vehicle drive force control system as defined in claim 9, wherein the second mechanism further comprises a servo valve which regulates the hydraulic pressure according to an command signal and the microprocessor is further programmed to output the command signal to the servo valve to increase the hydraulic pressure.

* * * * *